US012542617B2

(12) United States Patent
Xu et al.

(10) Patent No.: US 12,542,617 B2
(45) Date of Patent: Feb. 3, 2026

(54) CROSS-LINK INTERFERENCE MEASUREMENT OVER MULTIPLE BEAMS

(71) Applicant: QUALCOMM INCORPORATED, San Diego, CA (US)

(72) Inventors: Huilin Xu, Temecula, CA (US); Qunfeng He, San Diego, CA (US); Yuwei Ren, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 17/998,403

(22) PCT Filed: Jun. 11, 2020

(86) PCT No.: PCT/CN2020/095517
§ 371 (c)(1),
(2) Date: Nov. 10, 2022

(87) PCT Pub. No.: WO2021/248397
PCT Pub. Date: Dec. 16, 2021

(65) Prior Publication Data
US 2023/0188229 A1 Jun. 15, 2023

(51) Int. Cl.
*H04B 17/336* (2015.01)
*H04W 24/10* (2009.01)
*H04W 56/00* (2009.01)

(52) U.S. Cl.
CPC .......... *H04B 17/336* (2015.01); *H04W 24/10* (2013.01); *H04W 56/0015* (2013.01)

(58) Field of Classification Search
CPC ............................ H04B 17/336; H04W 24/10
See application file for complete search history.

(56) References Cited

U.S. PATENT DOCUMENTS 11,025,348 B2 * 6/2021 Nam .................... H04B 7/0417
11,496,204 B2 11/2022 Guan et al.
(Continued)

FOREIGN PATENT DOCUMENTS

CN 108289336 A 7/2018
CN 109088683 A 12/2018
(Continued)

OTHER PUBLICATIONS

Supplementary European Search Report—EP20940418—Search Authority—Munich—Feb. 8, 2024.
(Continued)

*Primary Examiner* — Zhiren Qin
(74) *Attorney, Agent, or Firm* — Holland & Hart LLP /Qualcomm

(57) ABSTRACT

Methods, systems, and devices for wireless communications are described. Generally, a base station may configure one or more cross-link interference measurement resources on which a user equipment (UE) is to measure CLI. The UE may measure CLI from a single aggressor UE in multiple receive directions. The UE may identify receive beams on which it receives other signal types, and use those receive beams to measure CLI. In some examples, the base station may explicitly indicate to the UE which receive beams it is to use for CLI measurements. The UE may measure CLI on each CLI measurement resource using the identified receive beam, and may transmit, to the base station, a CLI report including CLI measurements, an indication of resource on which CLI measurements were taken, or a combination thereof.

18 Claims, 16 Drawing Sheets

(56) References Cited

U.S. PATENT DOCUMENTS

| | | | |
|---|---|---|---|
| 2016/0380354 A1* | 12/2016 | Bozier | H01Q 1/42 |
| | | | 455/562.1 |
| 2018/0323887 A1 | 11/2018 | Azarian Yazdi et al. | |
| 2020/0112420 A1 | 4/2020 | Xu et al. | |
| 2020/0145983 A1* | 5/2020 | Levitsky | H04L 5/0053 |
| 2020/0178203 A1* | 6/2020 | Lee | H04W 68/005 |
| 2020/0359459 A1* | 11/2020 | Kakishima | H04L 5/0094 |
| 2021/0242922 A1* | 8/2021 | Koskela | H04W 72/046 |
| 2021/0249768 A1 | 8/2021 | Ioffe et al. | |
| 2021/0345141 A1 | 11/2021 | Cao | |
| 2022/0104214 A1* | 3/2022 | Ying | H04W 72/1273 |
| 2022/0116129 A1* | 4/2022 | Ying | H04B 7/063 |
| 2022/0159662 A1* | 5/2022 | Li | H04L 5/0051 |
| 2022/0264324 A1* | 8/2022 | Guo | H04W 74/0841 |

FOREIGN PATENT DOCUMENTS

| | | |
|---|---|---|
| CN | 110475355 A | 11/2019 |
| CN | 110831047 A | 2/2020 |
| CN | 110972156 A | 4/2020 |
| WO | WO-2018171006 A1 | 9/2018 |
| WO | WO-2019214725 A1 | 11/2019 |
| WO | WO-2020052491 A1 | 3/2020 |

OTHER PUBLICATIONS

3GPP TR 38.802: "3rd Generation Partnership Project, Technical Specification Group Radio Access Network, Study on New Radio Access Technology, Physical Layer Aspects (Release 14)", V14.2.0, 3GPP Organizational Partners, Sophia Antipolis Valbonne, France, Sep. 2017, pp. 1-145.

3GPP TS 38.214: "3rd Generation Partnership Project, Technical Specification Group Radio Access Network, NR, Physical layer procedures for data, (Release 16)", V16.1.0, 3GPP Organizational Partners, Sophia Antipolis Valbonne, France, Mar. 2020, p. 54, pp. 1-151.

3GPP TS 38.331: "3rd Generation Partnership Project, Technical Specification Group Radio Access Network, NR, Radio Resource Control (RRC) protocol specification, (Release 16)", V16.0.0, 3GPP Organizational Partners, Sophia Antipolis Valbonne, France, Mar. 2020, pp. 357-360 & 524-526, pp. 1-835.

International Search Report and Written Opinion—PCT/CN2020/095517—ISA/EPO—Mar. 10, 2021.

LG Electronics: "Discussion on CLI Measurement for Duplexing Flexibility", 3GPP Draft, 3GPP TSG RAN WG1 NR Ad-Hoc#2, R1-1710350 Discussion on CLI Measurement for Duplexing Flexibility, 3rd Generation Partnership Project (3GPP), Mobile Competence Centre, 650, Route Des Lucioles, F-06921 Sophia-Antipolis, vol. RAN WG1, No. Qingdao, P.R. China, Jun. 27, 2017-Jun. 30, 2017, Jun. 26, 2017 (Jun. 26, 2017), XP051299564, 7 Pages, p. 6, Section 2.

\* cited by examiner

Downlink Symbol (D) 225

Uplink Symbol (U) 235

Flexible Symbol (X) 230

CROSS-LINK INTERFERENCE MEASUREMENT OVER MULTIPLE BEAMS

CROSS REFERENCE

The present application is a 371 national stage filing of International PCT Application No. PCT/CN2020/095517 by X U et al. entitled "CROSS-LINK INTERFERENCE MEASUREMENT OVER MULTIPLE BEAMS," filed Jun. 11, 2020, which is assigned to the assignee hereof, and which is expressly incorporated by reference in its entirety herein.

FIELD OF TECHNOLOGY

The following relates generally to wireless communications and more specifically to cross-link interference measurement in multiple directions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipments (UEs). A carrier may be configured for operation according to time division duplexing (TDD), and various UEs may operate using the same or different TDD configurations.

SUMMARY

The described techniques relate to improved methods, systems, devices, and apparatuses that support cross-link interference (CLI) measurement in multiple directions. Generally, a base station may configure one or more CLI measurement resources on which a UE is to measure CLI. The UE may measure CLI (e.g., from one or more aggressor UEs) in multiple receive directions. The UE may determine which receive beams on which to measure CLI implicitly, based on which receive beams the UE uses for receiving one or more downlink signals (e.g., channel state information reference signals (CSI-RSs), synchronization signal blocks (SSBs), reference signals associated with a transmission configuration indicator (TCI) configuration, reference signals associated with receiving physical downlink shared channels (PDSCHs) or physical downlink control channels (PDCCHs), or failure detection reference signals). The victim UE may thus identify receive beams on which it receives other signal types, and use those receive beams to measure CLI. In some examples, the base station may explicitly indicate to the UE which receive beams it is to use for CLI measurements. For instance, the base station may indicate a list of reference signal indices for reference signals associated with receive beams, and the UE may use the associated receive beams in accordance with an indicated or preconfigured time-domain beam sweeping pattern to perform CLI measurements. In some examples, the base station may configure each CLI measurement resource, and may indicate an index for a reference signal (e.g., a CSI-RS or SSB) associated with a receive beam for each configured CLI measurement resource. In such examples, the UE may measure CLI on each CLI measurement resource using the indicated receive beam.

Having measured CLI using the identified receive beams, the UE may transmit a CLI report to the base station. The CLI report may include CLI measurements, indices of reference signals (e.g., CSI-RSs or SSBs) associated with receive beams or transmit beams, or a combination thereof.

A method of wireless communications at a UE is described. The method may include identifying a first set of resources for performing cross-link interference measurements, identifying a set of receive beams for performing the cross-link interference measurement over the identified first set of resources, performing cross-link interference measurements during at least a portion of the first set of resources using the set of receive beams, and transmitting, to a base station, a cross-link interference report including an indication of the cross-link interference measurements for the set of receive beams.

An apparatus for wireless communications at a UE is described. The apparatus may include a processor, memory coupled with the processor, and instructions stored in the memory. The instructions may be executable by the processor to cause the apparatus to identify a first set of resources for performing cross-link interference measurements, identify a set of receive beams for performing the cross-link interference measurement over the identified first set of resources, perform cross-link interference measurements during at least a portion of the first set of resources using the set of receive beams, and transmit, to a base station, a cross-link interference report including an indication of the cross-link interference measurements for the set of receive beams.

Another apparatus for wireless communications at a UE is described. The apparatus may include means for identifying a first set of resources for performing cross-link interference measurements, identifying a set of receive beams for performing the cross-link interference measurement over the identified first set of resources, performing cross-link interference measurements during at least a portion of the first set of resources using the set of receive beams, and transmitting, to a base station, a cross-link interference report including an indication of the cross-link interference measurements for the set of receive beams.

A non-transitory computer-readable medium storing code for wireless communications at a UE is described. The code may include instructions executable by a processor to identify a first set of resources for performing cross-link interference measurements, identify a set of receive beams for performing the cross-link interference measurement over the identified first set of resources, perform cross-link interference measurements during at least a portion of the first set of resources using the set of receive beams, and transmit, to a base station, a cross-link interference report including an indication of the cross-link interference measurements for the set of receive beams.

Some examples of the method, apparatuses, and non-transitory computer-readable medium described herein may further include operations, features, means, or instructions for determining an association between the set of receive beams and one or more downlink signals, the one or more downlink signals associated with a second set of resources.

Some examples of the method, apparatuses, and non-transitory computer-readable medium described herein may further include operations, features, means, or instructions for receiving, from the base station, a configuration message indicating the second set of resources, the set of receive beams, or both.

In some examples of the method, apparatuses, and non-transitory computer-readable medium described herein, the second set of resources include channel state information reference signal resources, synchronization signal resources, physical broadcast channel resources, failure detection reference signal resources, or a combination thereof.

Some examples of the method, apparatuses, and non-transitory computer-readable medium described herein may further include operations, features, means, or instructions for receiving, from the base station, a configuration message indicating a set of transmission configuration indicator (TCI) states associated with a physical downlink shared channel, and receiving, from the base station, a control message including an instruction to activate a subset of the set of TCI states for communications over the physical downlink shared channel.

Some examples of the method, apparatuses, and non-transitory computer-readable medium described herein may further include operations, features, means, or instructions for identifying the first set of resources may be based on a reference signal configured for the subset of the set of TCI states.

Some examples of the method, apparatuses, and non-transitory computer-readable medium described herein may further include operations, features, means, or instructions for identifying the first set of resources may be based on one or more reference signals associated with the set of TCI states of control resource sets.

Some examples of the method, apparatuses, and non-transitory computer-readable medium described herein may further include operations, features, means, or instructions for receiving, from the base station, a radio resource control message configuring the first set of resources, the radio resource control message including an indication of the one or more downlink signals associated with the set of receive beams, where identifying the set of receive beams for performing the cross-link interference measurement may be based on receiving the radio resource control message.

In some examples of the method, apparatuses, and non-transitory computer-readable medium described herein, the one or more downlink signals include synchronization signal block reference signals, channel state information reference signals, or a combination thereof.

Some examples of the method, apparatuses, and non-transitory computer-readable medium described herein may further include operations, features, means, or instructions for identifying a beam sweeping pattern for the set of receive beams associated with the one or more downlink signals, where performing cross-link interference measurements during at least the portion of the first set of resources using the set of receive beams may be based on the beam sweeping pattern for the set of receive beams.

Some examples of the method, apparatuses, and non-transitory computer-readable medium described herein may further include operations, features, means, or instructions for receiving a control message configuring the first set of resources from the base station, the control message including an index associated with a synchronization signal block or a channel state information reference signal for determining at least one receive beam of the set of receive beams for each respective resource of the first set of resources.

In some examples of the method, apparatuses, and non-transitory computer-readable medium described herein, each of the first set of resources may be located in a different transmission time interval.

In some examples of the method, apparatuses, and non-transitory computer-readable medium described herein, the control message includes an information element of a radio resource control message.

In some examples of the method, apparatuses, and non-transitory computer-readable medium described herein, the cross-link interference report includes a first set of cross-link interference measurement values associated with a first subset of the set of receive beams, where the first set of cross-link interfere measurement values may be higher than a second set of cross-link interference measurement values associated with a second subset of the set of receive beams.

In some examples of the method, apparatuses, and non-transitory computer-readable medium described herein, the cross-link interference report further includes one or more indices of synchronization signal blocks or channel state information reference signals associated with the set of receive beams.

In some examples of the method, apparatuses, and non-transitory computer-readable medium described herein, the cross-link interference report includes one or more indices of synchronization signal blocks or channel state information reference signals associated with a first subset of the set of receive beams, where cross-link interfere measurement values for the first subset of the set of receive beams may be higher than cross-link interference measurements for a second subset of the set of receive beams.

Some examples of the method, apparatuses, and non-transitory computer-readable medium described herein may further include operations, features, means, or instructions for performing a filtering procedure for a set of cross-link interference measurements, where transmitting the cross-link interference report may be based on performing the filtering procedure.

In some examples of the method, apparatuses, and non-transitory computer-readable medium described herein, performing cross-link interference measurements may include operations, features, means, or instructions for measuring one or more reference signals transmitted by a second UE.

In some examples of the method, apparatuses, and non-transitory computer-readable medium described herein, performing cross-link interference measurements may include operations, features, means, or instructions for measuring a received power on the first set of resources.

A method of wireless communications at a base station is described. The method may include configuring, for a first UE, a first set of resources for performing cross-link interference measurements, identifying a set of downlink signals associated with a set of receive beams to be used by the first UE for performing the cross-link interference measurement over the identified first set of resources, and receiving, from the first UE, a cross-link interference report including an indication of the cross-link interference measurements for at least a subset of the set of receive beams.

An apparatus for wireless communications at a base station is described. The apparatus may include a processor, memory coupled with the processor, and instructions stored in the memory. The instructions may be executable by the processor to cause the apparatus to configure, for a first UE, a first set of resources for performing cross-link interference measurements, identify a set of downlink signals associated with a set of receive beams to be used by the first UE for performing the cross-link interference measurement over the identified first set of resources, and receive, from the first UE, a cross-link interference report including an indication of the cross-link interference measurements for at least a subset of the set of receive beams.

Another apparatus for wireless communications at a base station is described. The apparatus may include means for configuring, for a first UE, a first set of resources for performing cross-link interference measurements, identifying a set of downlink signals associated with a set of receive beams to be used by the first UE for performing the cross-link interference measurement over the identified first set of resources, and receiving, from the first UE, a cross-link interference report including an indication of the cross-link interference measurements for at least a subset of the set of receive beams.

A non-transitory computer-readable medium storing code for wireless communications at a base station is described. The code may include instructions executable by a processor to configure, for a first UE, a first set of resources for performing cross-link interference measurements, identify a set of downlink signals associated with a set of receive beams to be used by the first UE for performing the cross-link interference measurement over the identified first set of resources, and receive, from the first UE, a cross-link interference report including an indication of the cross-link interference measurements for at least a subset of the set of receive beams.

Some examples of the method, apparatuses, and non-transitory computer-readable medium described herein may further include operations, features, means, or instructions for transmitting, to the first UE, a configuration message indicating the second set of resources, the set of receive beams, or both.

In some examples of the method, apparatuses, and non-transitory computer-readable medium described herein, the downlink signals include channel state information reference signals, synchronization signals, physical broadcast channels, failure detection reference signals, or a combination thereof.

Some examples of the method, apparatuses, and non-transitory computer-readable medium described herein may further include operations, features, means, or instructions for transmitting, to the first UE, a configuration message indicating a set of transmission configuration indicator (TCI) states associated with a physical downlink shared channel, and transmitting, to the first UE, a control message including an instruction to activate a subset of the set of TCI states for communications over the physical downlink shared channel.

Some examples of the method, apparatuses, and non-transitory computer-readable medium described herein may further include operations, features, means, or instructions for identifying the set of downlink signals may be based on a reference signal configured for the subset of the set of TCI states.

Some examples of the method, apparatuses, and non-transitory computer-readable medium described herein may further include operations, features, means, or instructions for identifying the set of downlink signals may be based on one or more reference signals associated with the set of TCI states of control resource sets.

Some examples of the method, apparatuses, and non-transitory computer-readable medium described herein may further include operations, features, means, or instructions for transmitting, to the first UE, a radio resource control message configuring the first set of resources, the radio resource control message including an indication of the set of downlink signals associated with the set of receive beams, where identifying the set of downlink signals associated with the set of receive beams to be used by the first UE for performing the cross-link interference measurement may be based on transmitting the radio resource control message.

In some examples of the method, apparatuses, and non-transitory computer-readable medium described herein, the downlink signals include synchronization signals, channel state information reference signals, or a combination thereof.

Some examples of the method, apparatuses, and non-transitory computer-readable medium described herein may further include operations, features, means, or instructions for transmitting, to the first UE, an indication of a beam sweeping pattern for the set of receive beams associated with the set of downlink signals, where identifying the set of downlink signals associated with the set of receive beams may be based on the beam sweeping pattern for the set of receive beams.

Some examples of the method, apparatuses, and non-transitory computer-readable medium described herein may further include operations, features, means, or instructions for transmitting, to the first UE, a control message configuring the first set of resources, the control message including an index associated with a synchronization signal block or a channel state information reference signal for determining at least one receive beam of the set of receive beams for each respective resource of the first set of resources.

In some examples of the method, apparatuses, and non-transitory computer-readable medium described herein, each of the first set of resources may be located in a different transmission time interval.

In some examples of the method, apparatuses, and non-transitory computer-readable medium described herein, the control message includes an information element of a radio resource control message.

In some examples of the method, apparatuses, and non-transitory computer-readable medium described herein, the cross-link interference report includes a first set of cross-link interference measurement values associated with a first subset of the set of receive beams, where the first set of cross-link interfere measurement values may be higher than a second set of cross-link interference measurement values associated with a second subset of the set of receive beams.

In some examples of the method, apparatuses, and non-transitory computer-readable medium described herein, the cross-link interference report further includes one or more indices of synchronization signal blocks or channel state information reference signals associated with the set of receive beams.

In some examples of the method, apparatuses, and non-transitory computer-readable medium described herein, the cross-link interference report includes one or more indices of synchronization signal blocks or channel state information reference signals associated with a first subset of the first set of resources associated with a first subset of the set of receive beams, where cross-link interfere measurement values for the first subset of the set of receive beams may be higher than cross-link interference measurements for a second subset of the set of receive.

measurement in multiple directions in accordance with aspects of the present disclosure.

Figure 2:
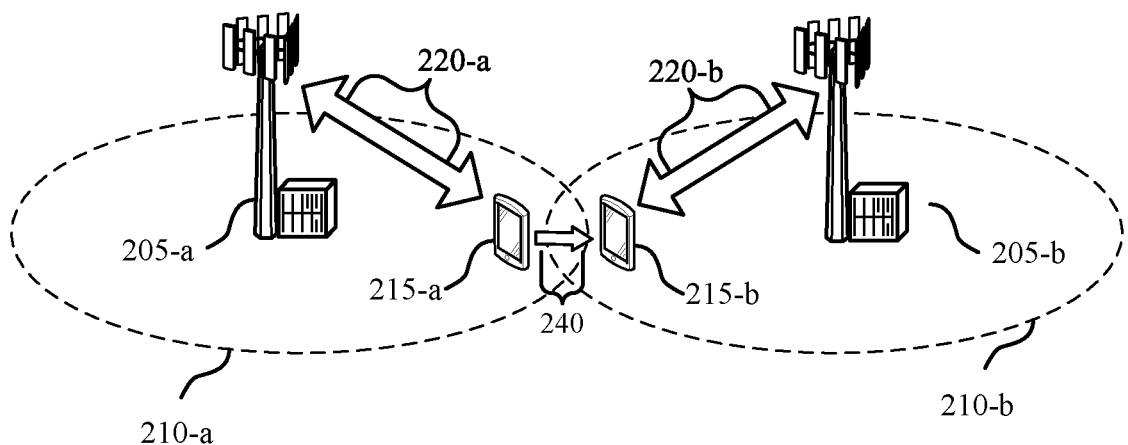
Figure 2:
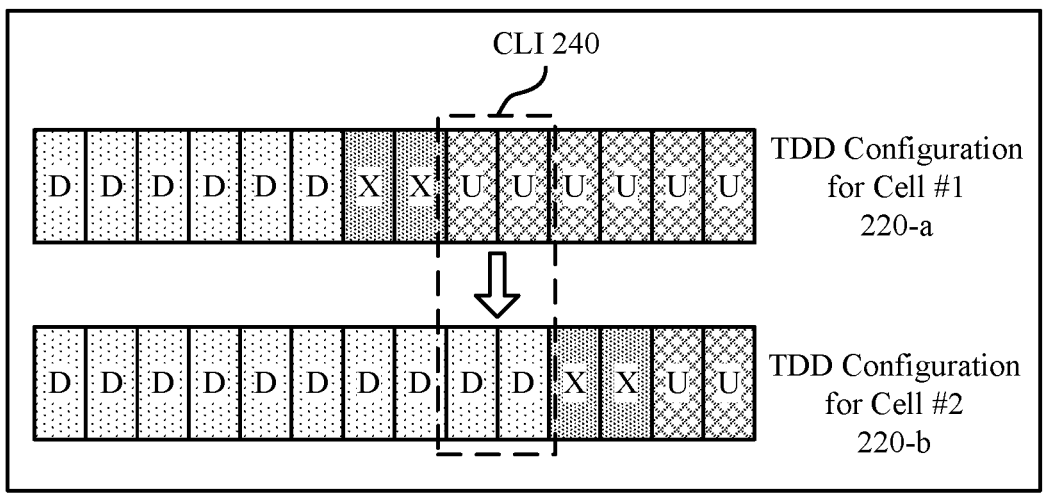
Figure 2:
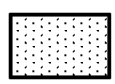
Figure 2:
Figure 2:
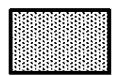

FIG. 2 illustrates an example of a wireless communications system that supports CLI measurement in multiple directions in accordance with aspects of the present disclosure.

Figure 3B:
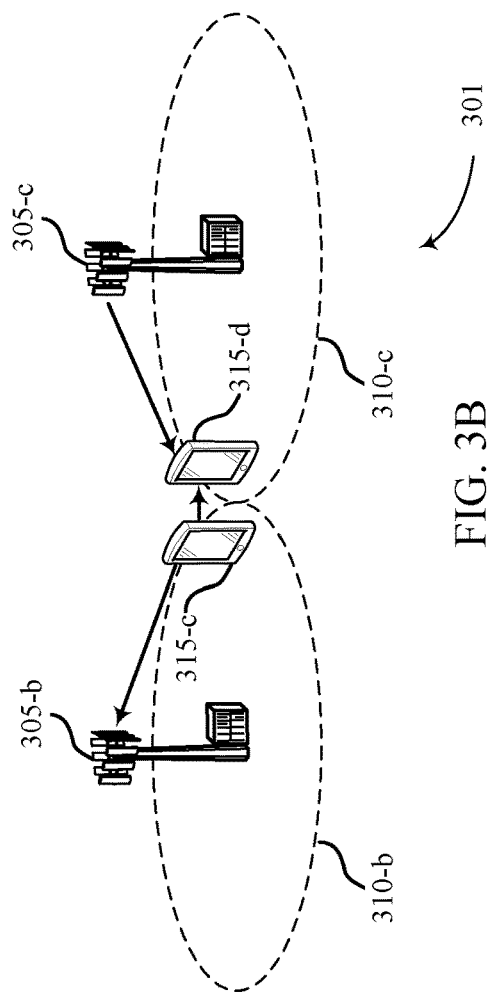
Figure 3A:
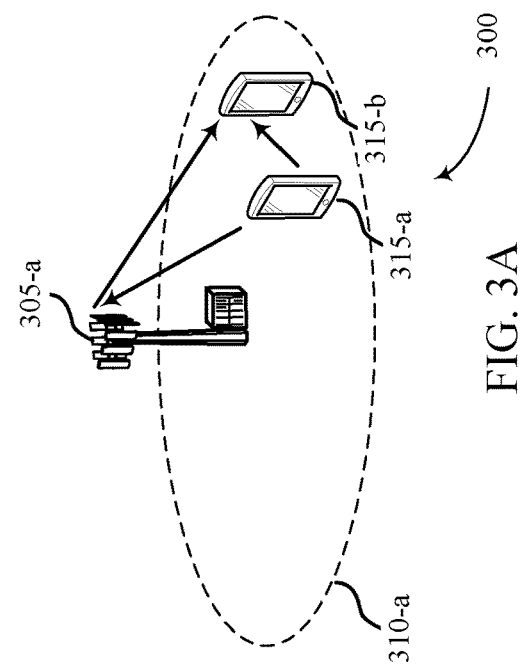

FIGS. 3A and 3B illustrate examples of wireless communications systems that supports CLI measurement in multiple directions in accordance with aspects of the present disclosure.

Figure 4:
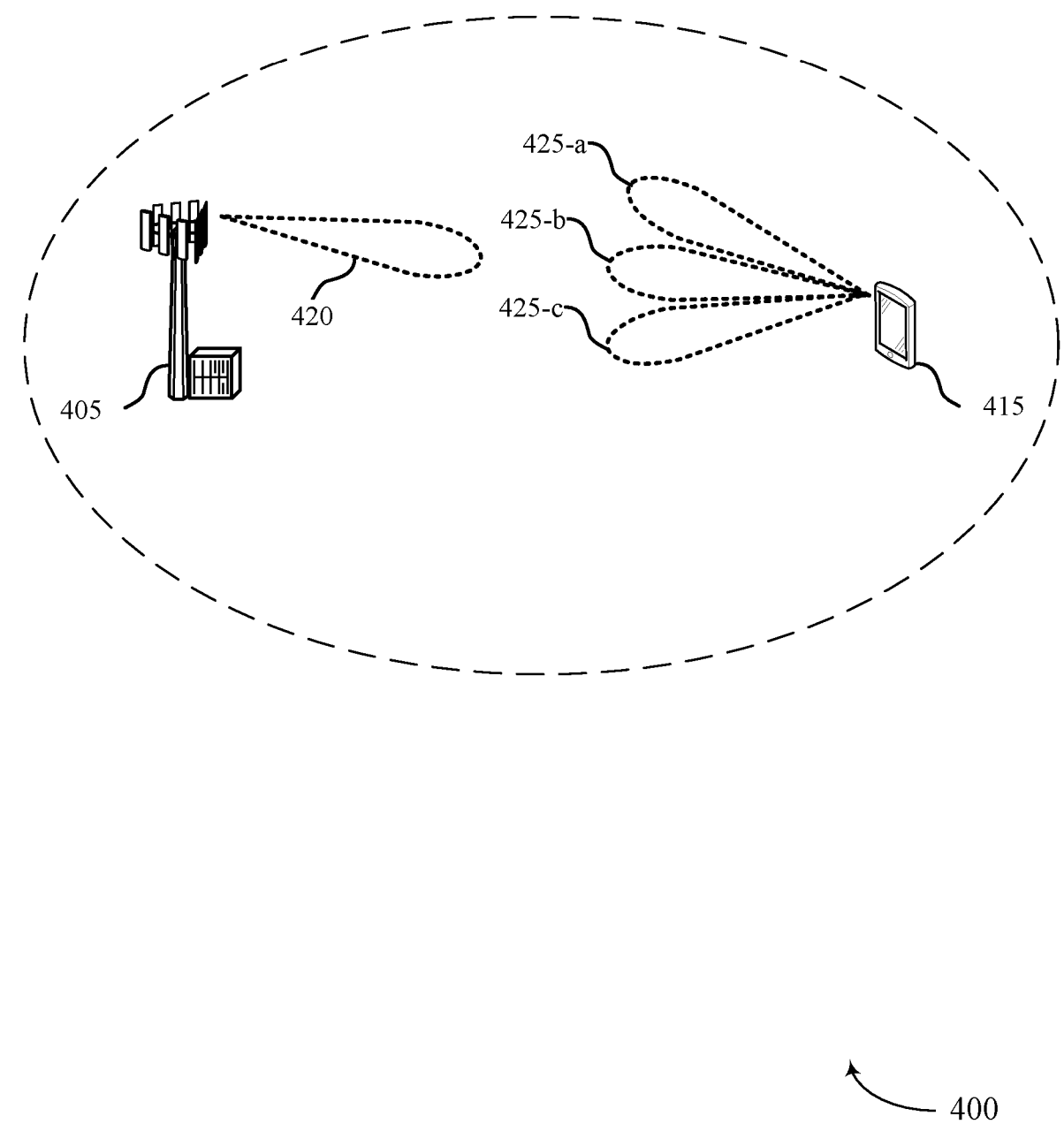

FIG. 4 illustrates an example of a wireless communications system that supports CLI measurement in multiple directions in accordance with aspects of the present disclosure.

Figure 5:
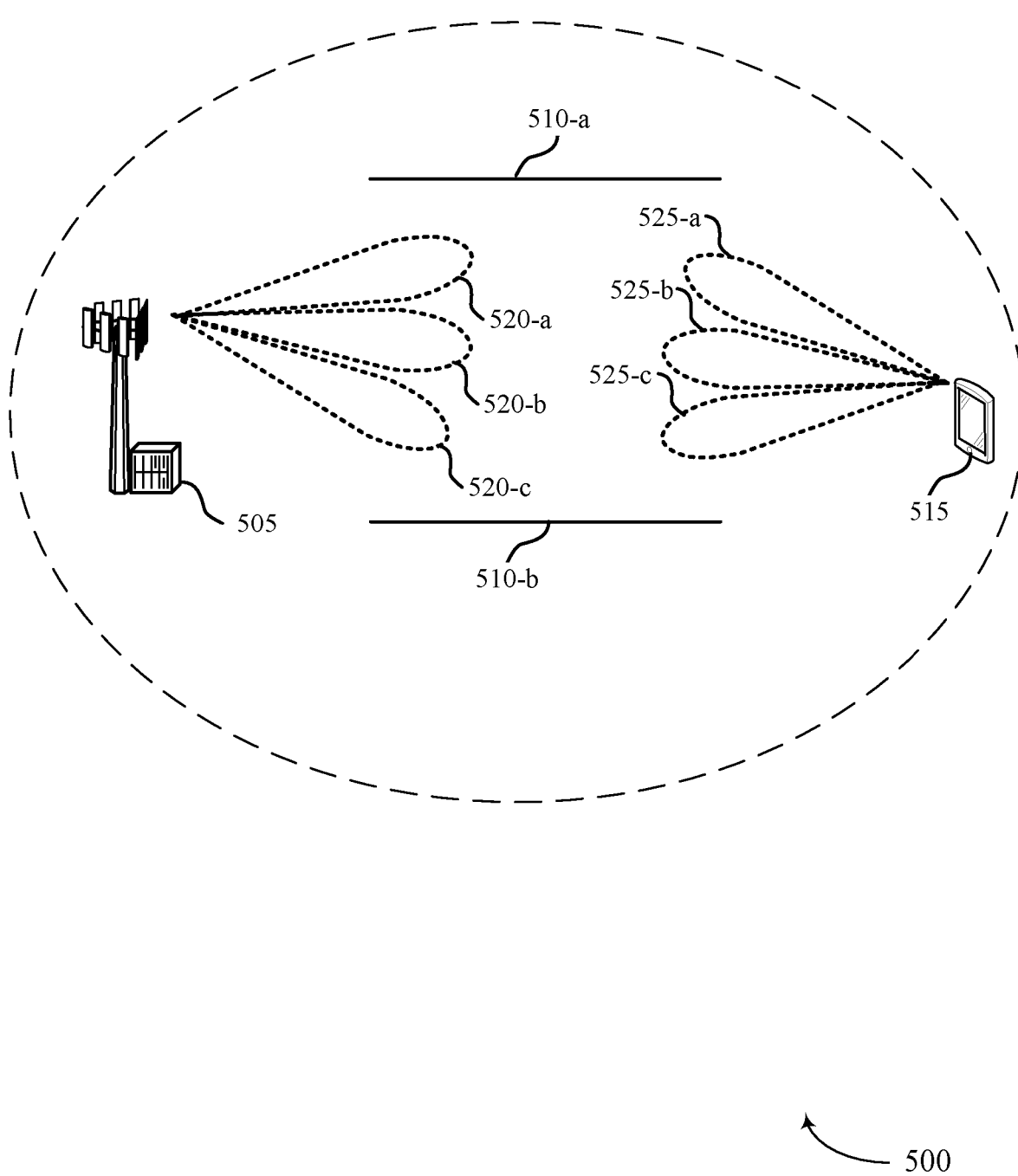

FIG. 5 illustrates an example of a wireless communications system that supports CLI measurement in multiple directions in accordance with aspects of the present disclosure.

Figure 6:
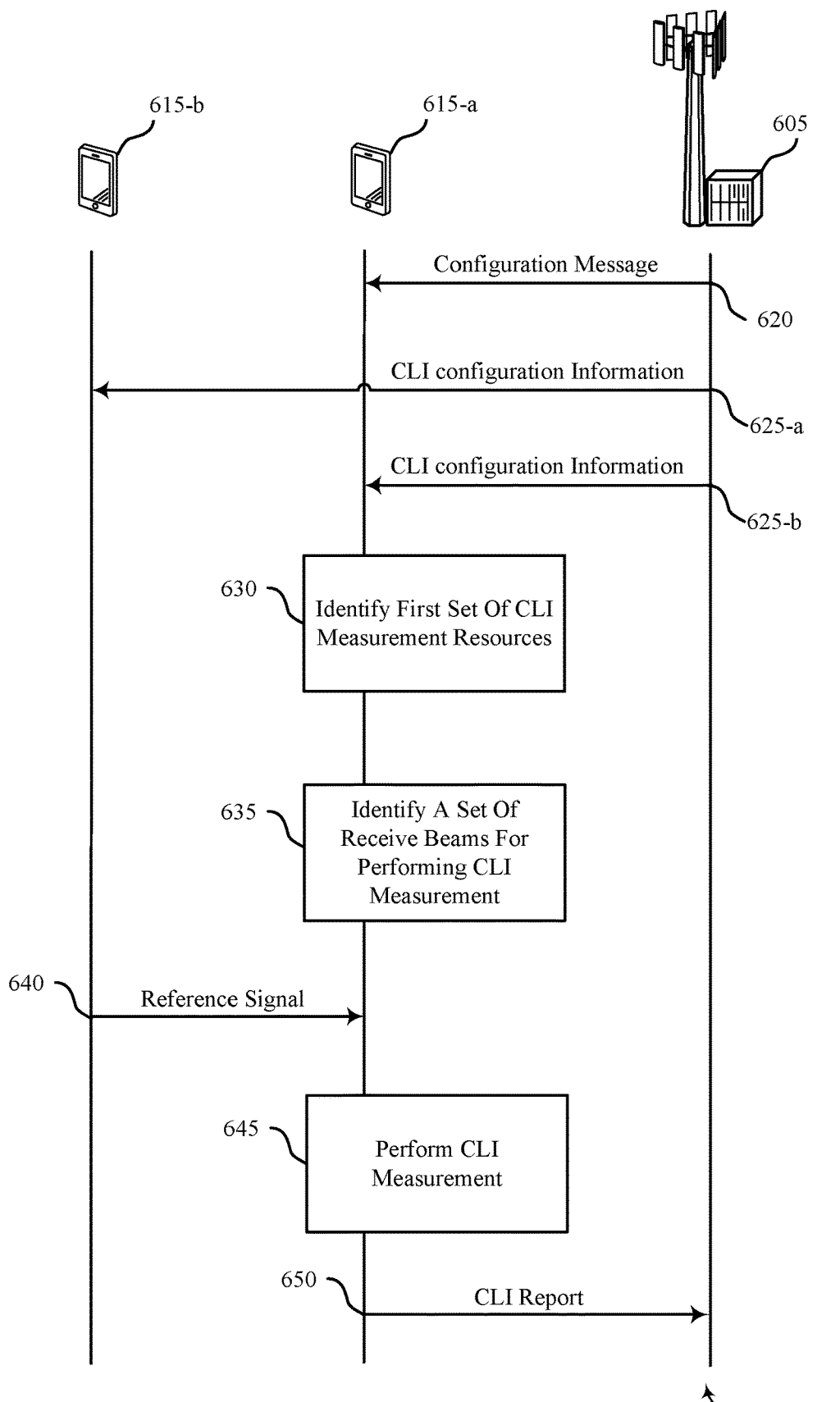

FIG. 6 illustrates an example of a process flow that supports CLI measurement in multiple directions in accordance with aspects of the present disclosure.

Figure 7:
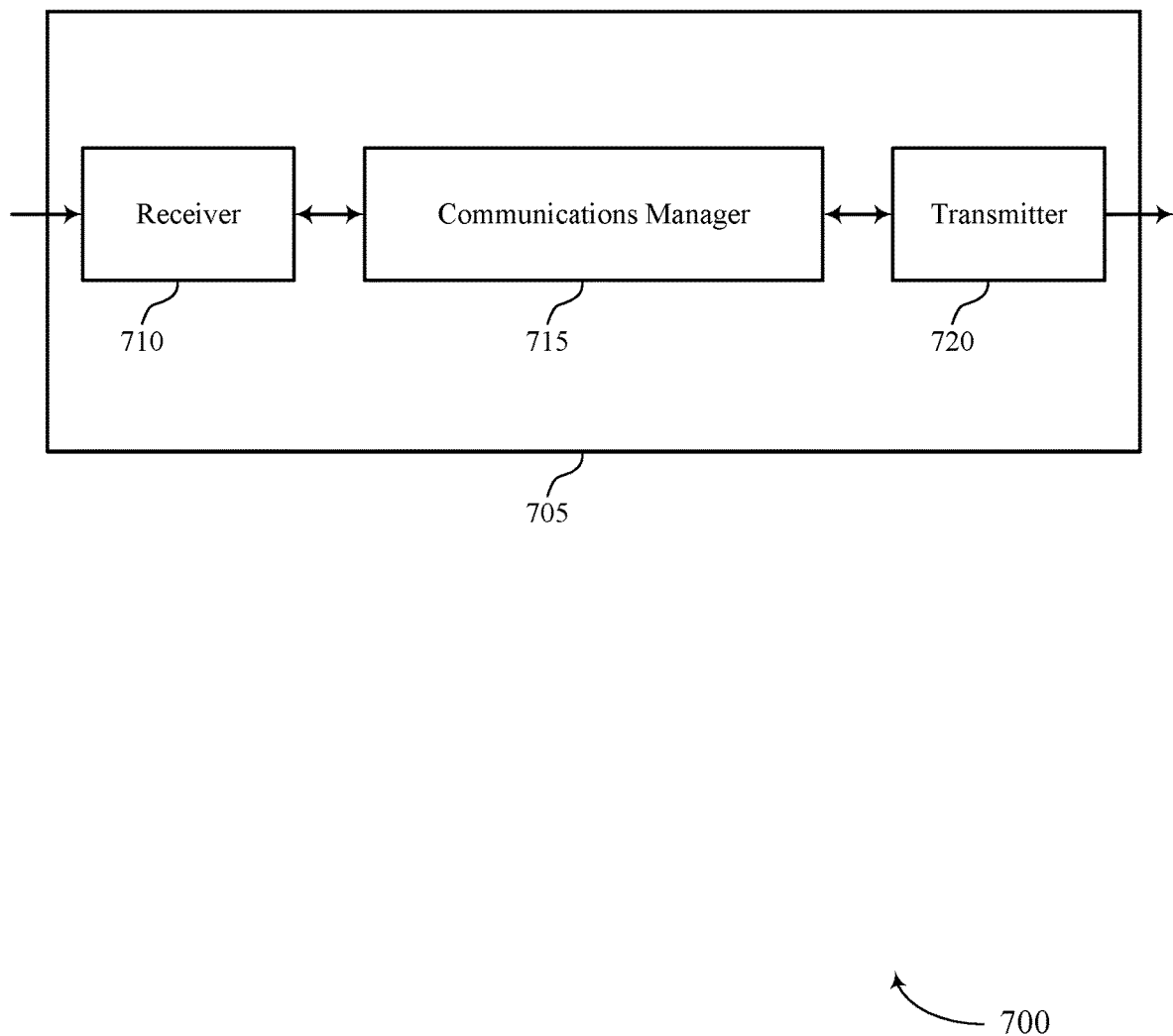
Figure 8:
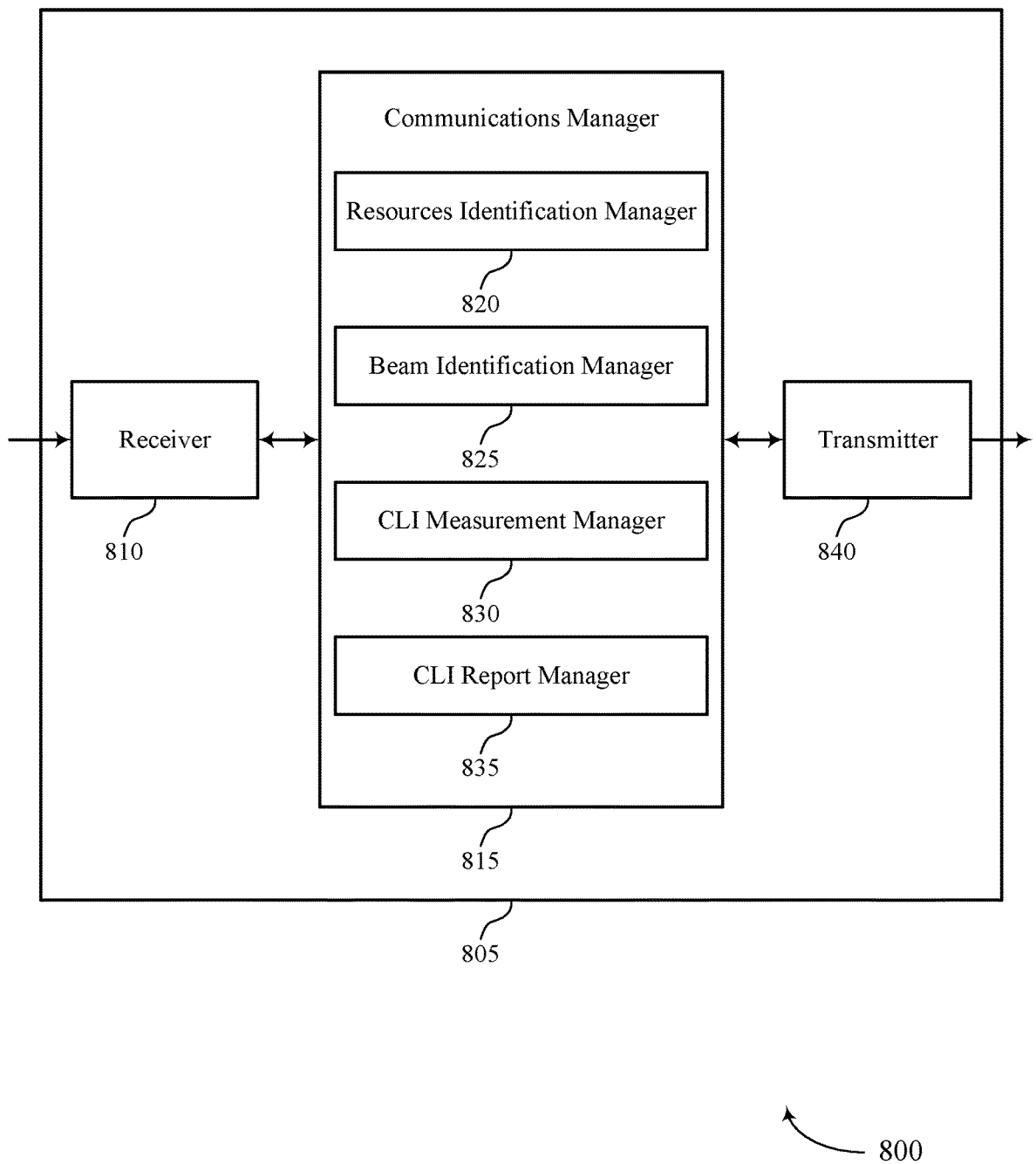

FIGS. 7 and 8 show block diagrams of devices that support CLI measurement in multiple directions in accordance with aspects of the present disclosure.

Figure 9:
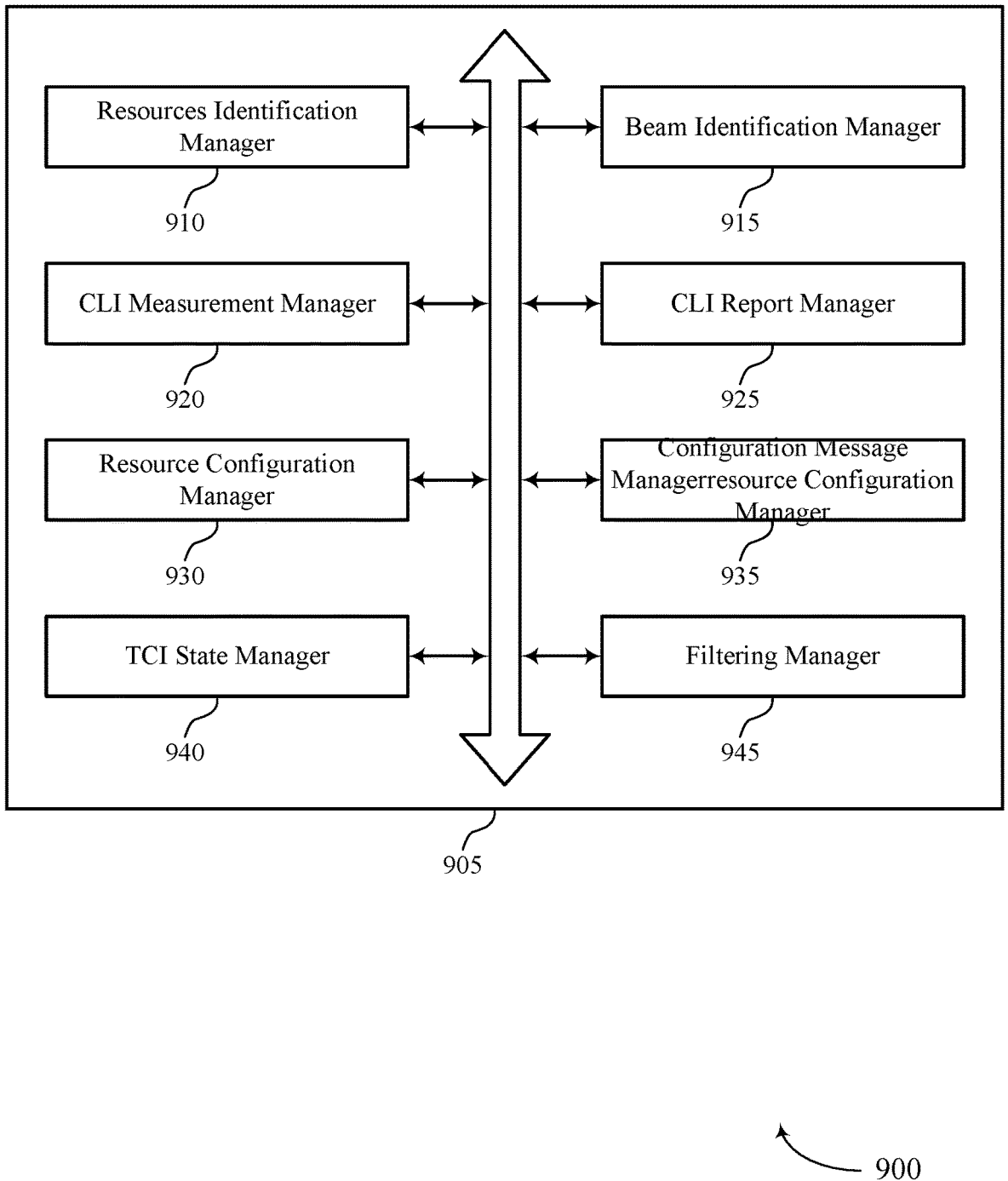

FIG. 9 shows a block diagram of a communications manager that supports CLI measurement in multiple directions in accordance with aspects of the present disclosure.

Figure 10:
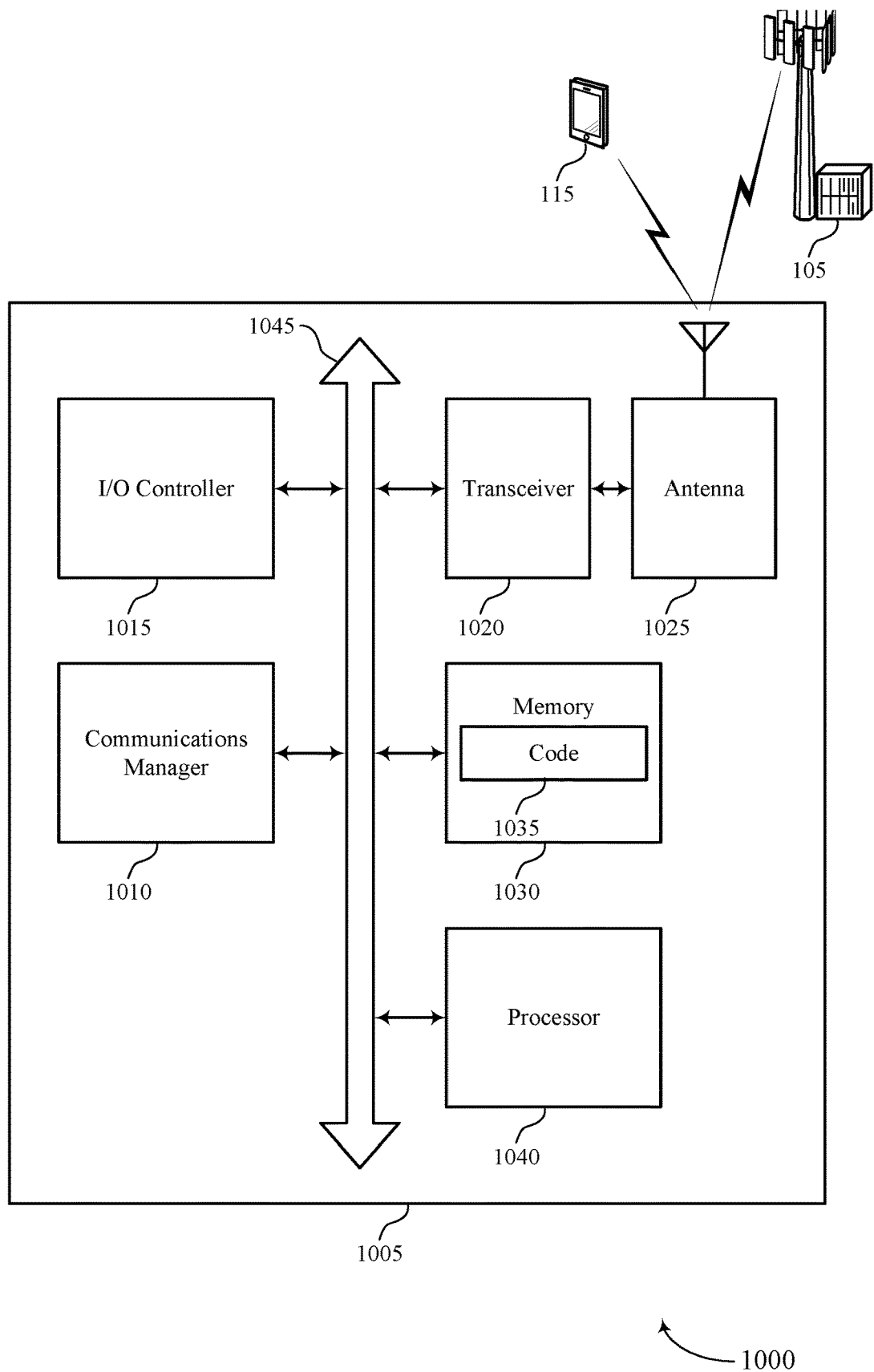

FIG. 10 shows a diagram of a system including a device that CLI measurement in multiple directions in accordance with aspects of the present disclosure.

Figure 11:
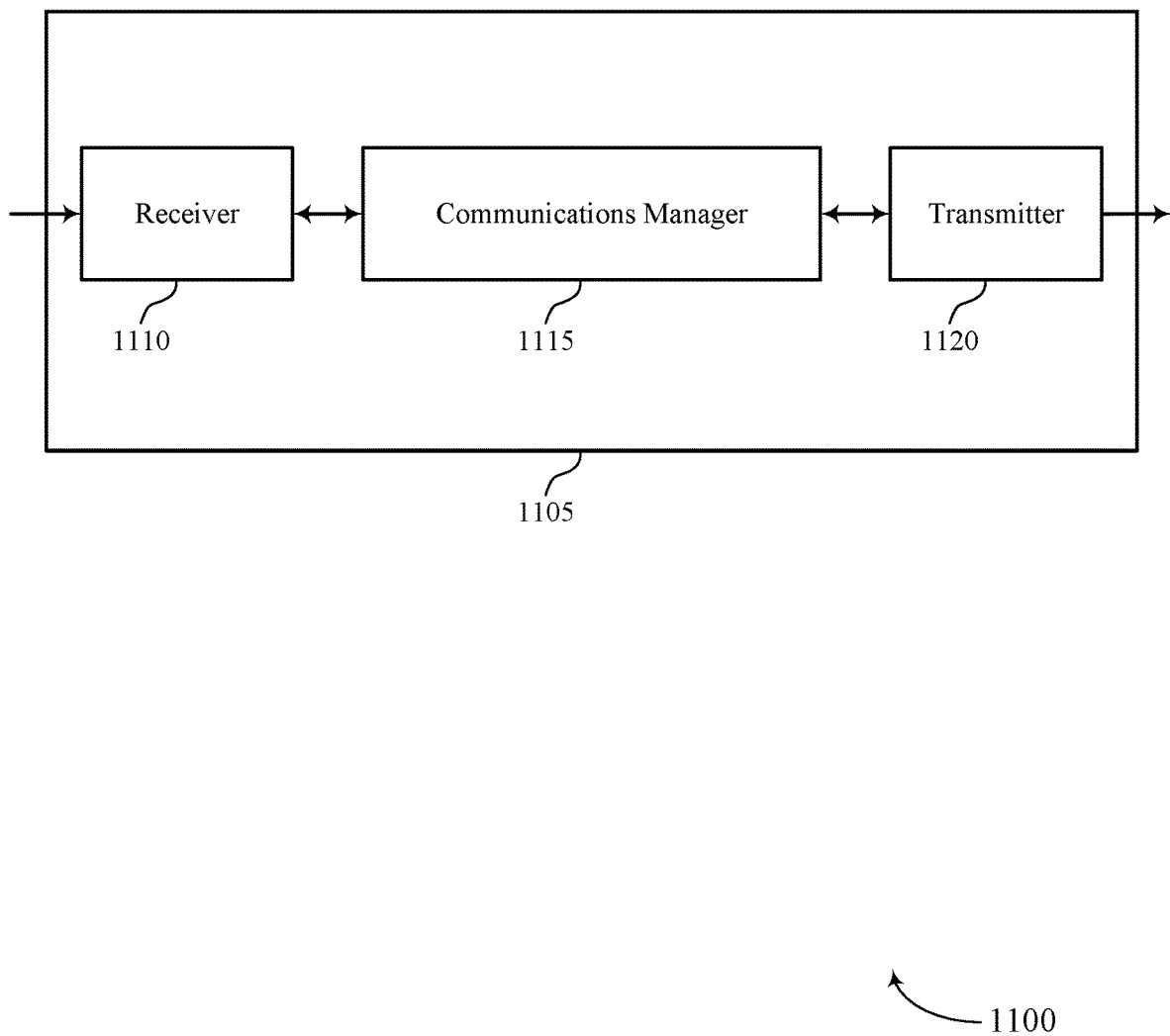
Figure 12:
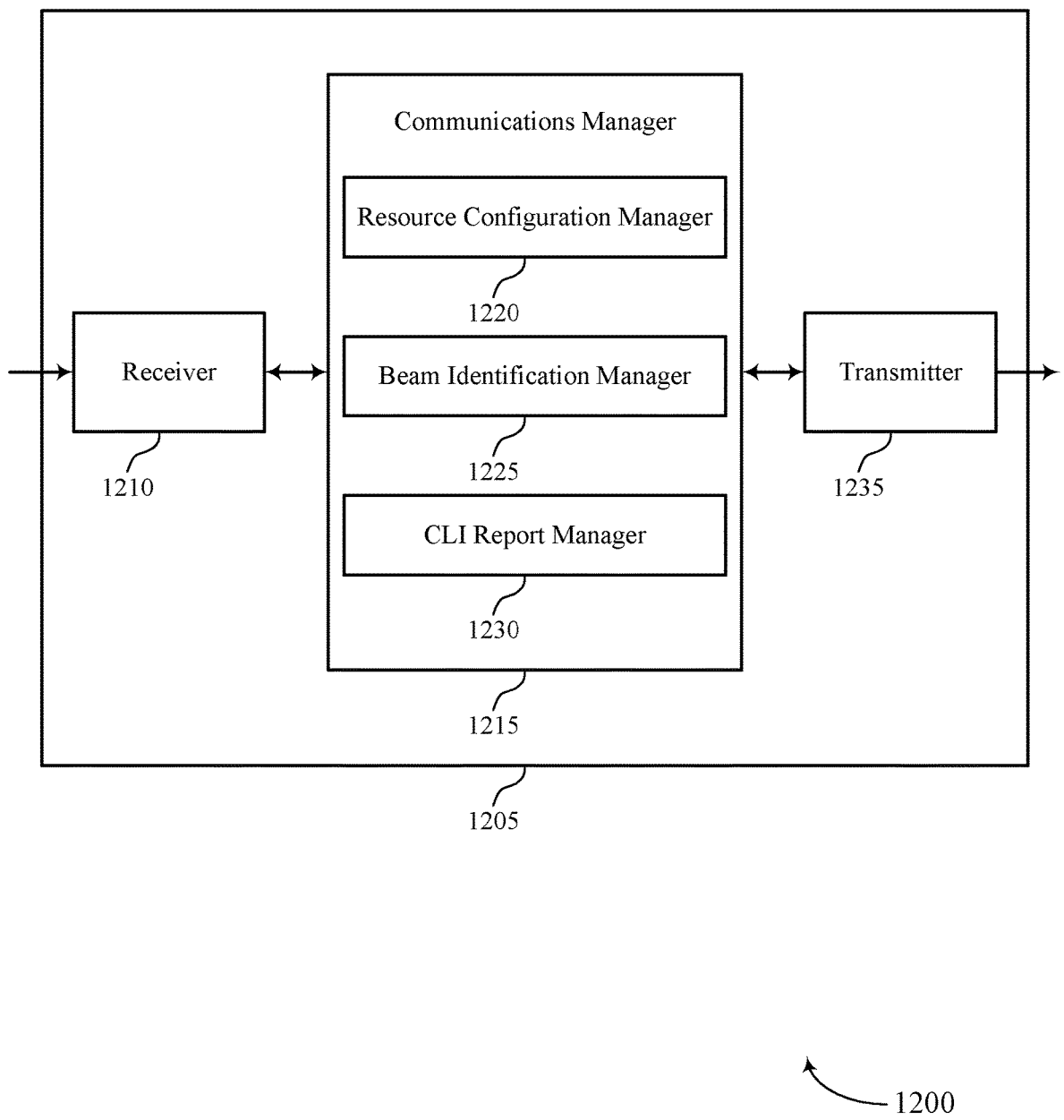

FIGS. 11 and 12 show block diagrams of devices that support CLI measurement in multiple directions in accordance with aspects of the present disclosure.

Figure 13:
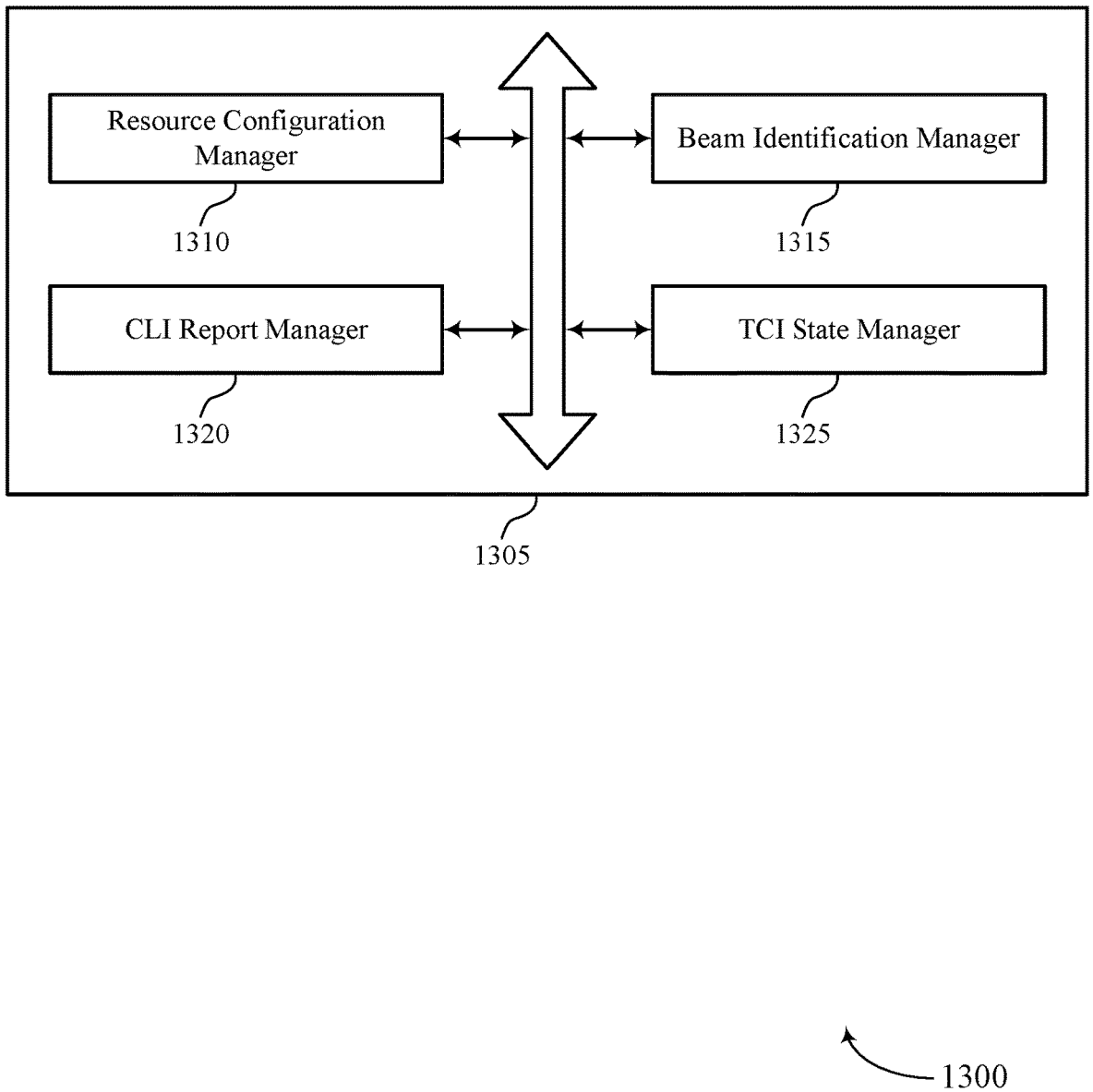

FIG. 13 shows a block diagram of a communications manager that supports CLI measurement in multiple directions in accordance with aspects of the present disclosure.

Figure 14:
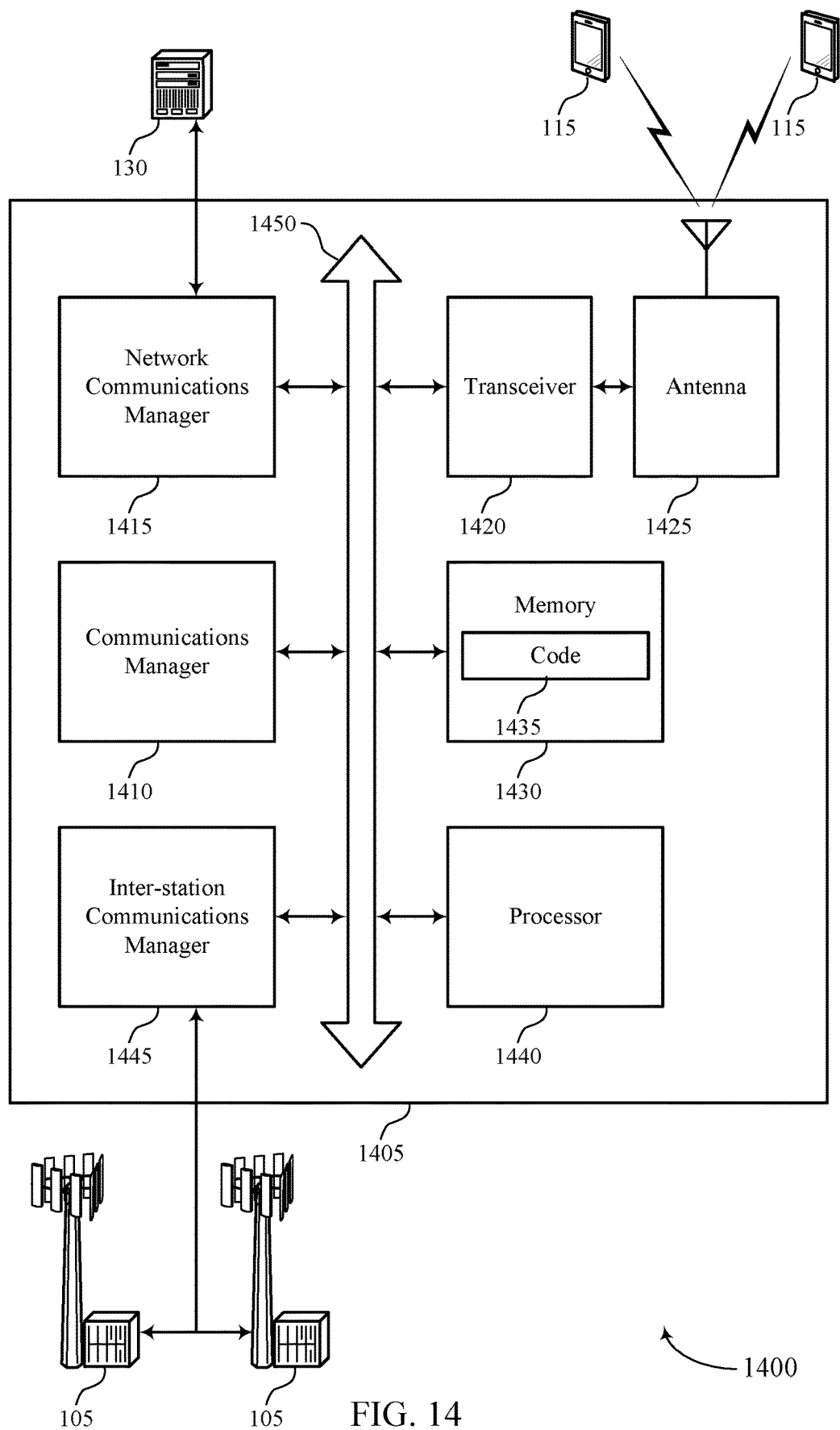

FIG. 14 shows a diagram of a system including a device that supports CLI measurement in multiple directions in accordance with aspects of the present disclosure.

Figure 15:
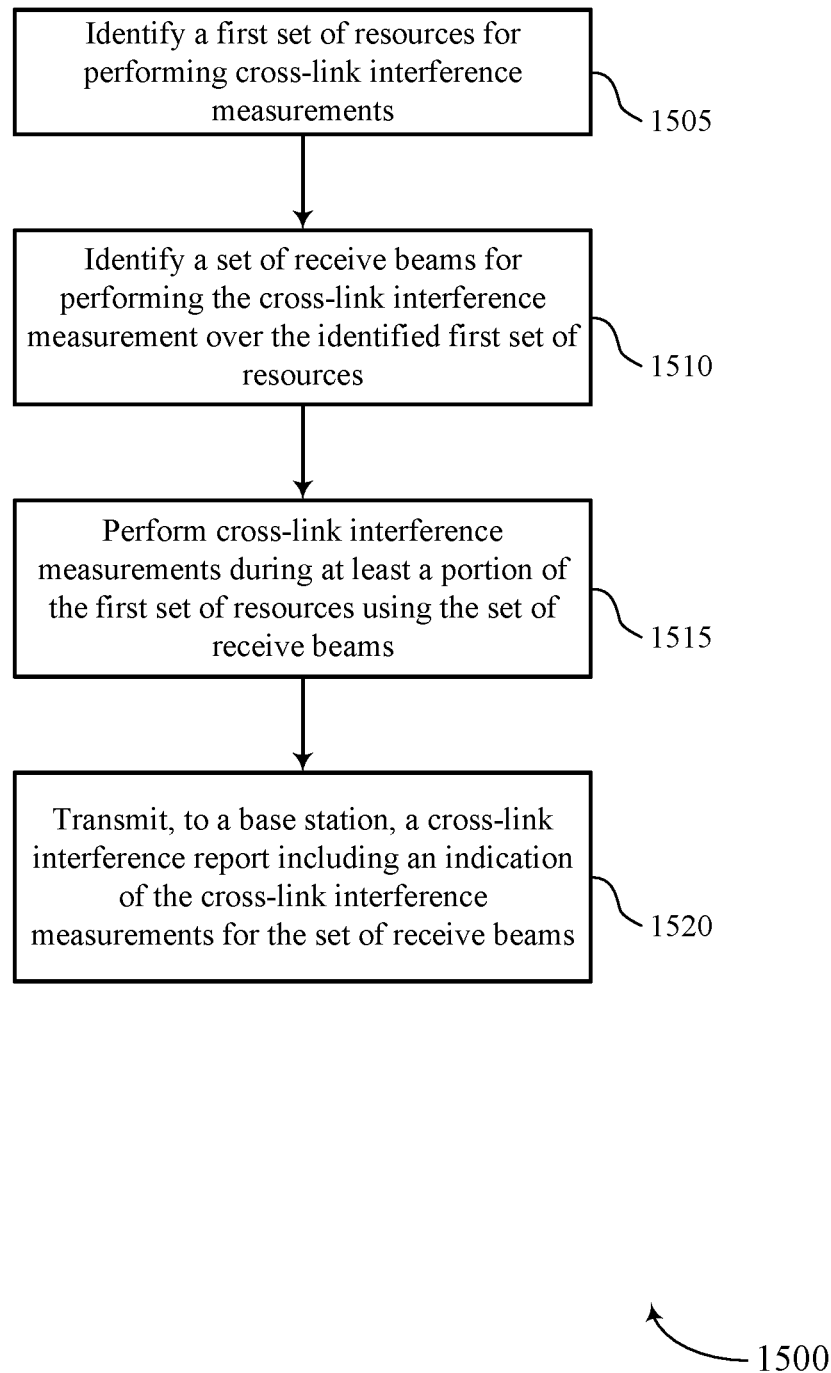
Figure 16:
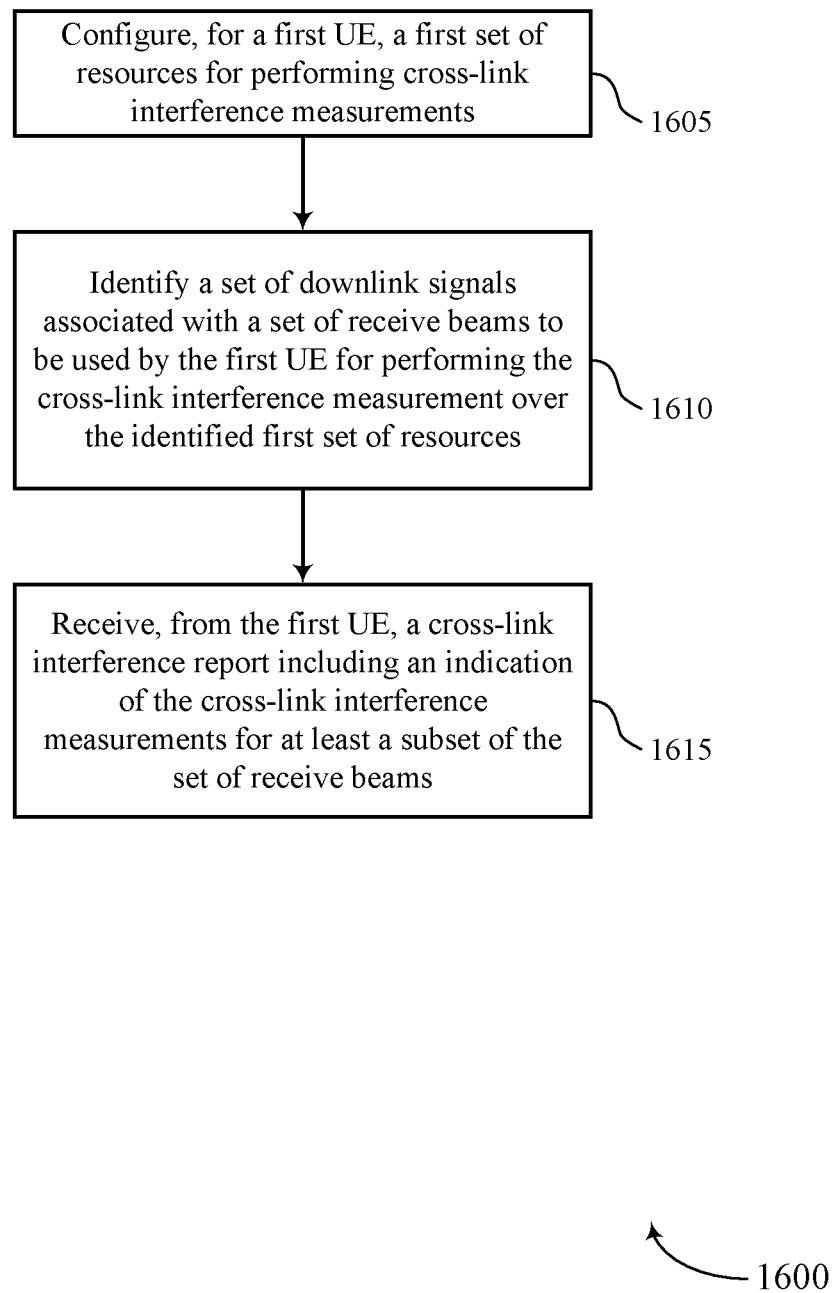

FIGS. 15 and 16 show flowcharts illustrating methods that support CLI measurement in multiple directions in accordance with aspects of the present disclosure.

DETAILED DESCRIPTION

In some examples of a wireless communications system, a user equipment (UE) may cause cross-link interference (CLI) to another UE. A base station may configure CLI measurement resources for measuring CLI, and a victim UE may perform CLI measurements during the CLI measurement resources. In some examples, a victim UE may be capable of receiving transmissions via multiple receive beams (e.g., from multiple directions). Thus, the victim UE may also experience varying levels of CLI on different receive beams. A base station may adjust beam pairing (e.g., based on current traffic conditions, interference levels, UE mobility, or CLI), resulting in the victim UE switching from one receive beam to another receive beam. If the victim UE does not measure or report CLI for multiple directions, then the base station may initiate a beam pair change that results in the victim UE switching from one receive beam on which it experiences CLI to another receive beam on which it also experiences CLI. However, if the victim UE measures and reports CLI in multiple directions, the base station may be able to more efficiently select beams on which to communicate, or more efficiently adjust time division duplex (TDD) configurations for victim or aggressor UEs to reduce CLI, or both. A UE that measures CLI in multiple directions may more effectively detect the presence of other neighboring UEs for sidelink applications, and improve positioning enhancement accuracy.

A base station may configure one or more CLI measurement resources on which a UE is to measure CLI. The UE may measure CLI (e.g., from one or more aggressor UEs) in multiple receive directions. The UE may determine which receive beams on which to measure CLI implicitly, based on which receive beams the UE uses for receiving one or more downlink signals (e.g., channel state information reference signals (CSI-RSs), synchronization signal blocks (SSBs), reference signals associated with a transmission configuration indicator (TCI) configuration, reference signals associated with receiving physical downlink shared channels (PDSCHs) or physical downlink control channels (PDCCHs), or failure detection reference signals). The victim UE may thus identify receive beams on which it receives other signal types, and use those receive beams to measure CLI. In some examples, the base station may explicitly indicate to the UE which receive beams it is to use for CLI measurements. For instance, the base station may indicate a list of reference signal indices for reference signals associated with receive beams, and the UE may use the associated receive beams in accordance with an indicated or preconfigured time-domain beam sweeping pattern to perform CLI measurements. In some examples, the base station may configure each CLI measurement resource, and may indicate an index for a reference signal (e.g., a CSI-RS or SSB) associated with a receive beam for each configured CLI measurement resource. In such examples, the UE may measure CLI on each CLI measurement resource using the indicated receive beam.

Having measured CLI using the identified receive beams, the UE may transmit a CLI report to the base station. The CLI report may include CLI measurements, indices of reference signals (e.g., CSI-RSs or SSBs) associated with receive beams or transmit beams, or a combination thereof.

Particular aspects of the subject matter described herein may be implemented to realize one or more advantages. The described techniques may support improvements in system efficiency such that a device may more effectively report CLI, resulting in improved configuration of TDD, reduced interference, improved adjustments in beam pairs, reduced system latency, and improved user experience. As such, supported techniques may include improved network operations and, in some examples, may promote device and network efficiencies, among other benefits.

Aspects of the disclosure are initially described in the context of wireless communications systems. Aspects of the disclosure are further illustrated by and described with reference to process flows. Aspects of the disclosure are further illustrated by and described with reference to apparatus diagrams, system diagrams, and flowcharts that relate to cross-link interference measurement in multiple directions.

Figure 1:
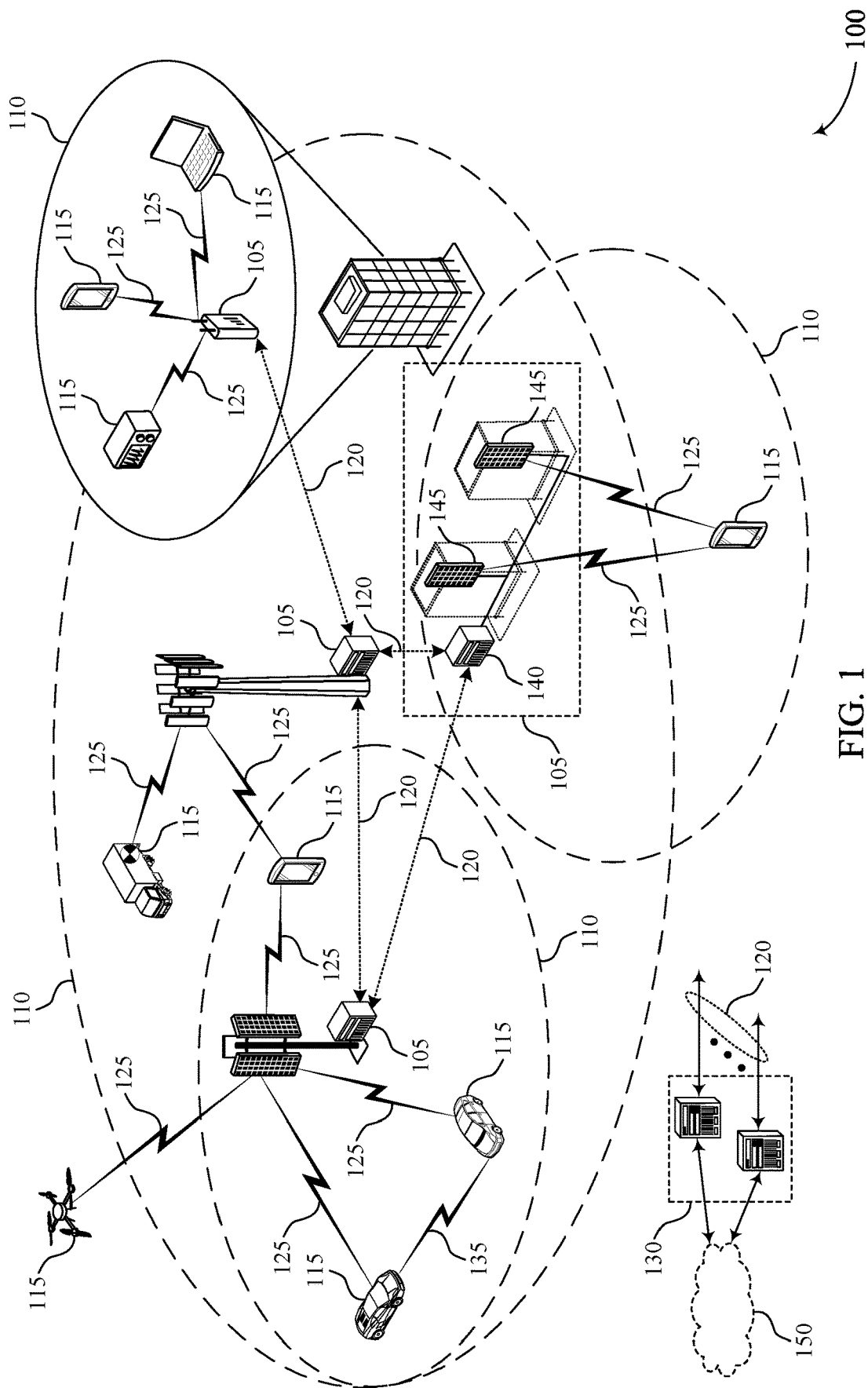
FIG. 1 illustrates an example of a system for wireless communications that supports cross-link interference (CLI)

FIG. 1 illustrates an example of a wireless communications system 100 that supports cross-link interference measurement in multiple directions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may configure one or more CLI measurement resources on which a UE 115 is to measure CLI. The UE 115 may measure CLI (e.g., from one or more aggressor UEs 115) in multiple receive directions. The UE 115 may determine which receive beams on which to measure CLI implicitly, based on which receive beams the UE 115 uses for receiving one or more downlink signals (e.g., channel state information reference signals (CSI-RSs), synchronization signal blocks (SSBs), reference signals associated with a transmission configuration indicator (TCI) configuration, reference signals associated with receiving physical downlink shared channels (PDSCHs) or physical downlink control channels (PDCCHs), or failure detection reference signals). The victim UE 115 may thus identify receive beams on which it receives other signal types, and use those receive beams to measure CLI. In some examples, the base station 105 may explicitly indicate to the UE 115 which receive beams it is to use for CLI measurements. For instance, the base station 105 may indicate a list of reference signal (e.g., CSI-RS or SSB) indices for reference signals associated with receive beams, and the UE 115 may use the associated receive beams in accordance with an indicated or preconfigured time-domain beam sweeping pattern to perform CLI measurements. In some examples, the base station 105 may configure each CLI measurement resource, and may indicate an index for a reference signal (e.g., a CSI-RS or SSB) associated with a receive beam for each configured CLI measurement resource. In such examples, the UE 115 may measure CLI on each CLI measurement resource using the indicated receive beam.

Having measured CLI using the identified receive beams, the UE 115 may transmit a CLI report to the base station 105. The CLI report may include CLI measurements, indices of reference signals (e.g., CSI-RSs or SSBs) associated with receive beams or transmit beams, or a combination thereof.

FIG. 2 illustrates an example of a wireless communications system 200 that supports cross-link interference measurement configuration in accordance with aspects of the present disclosure. In some examples, wireless communications system 200 may implement aspects of wireless communications system 100. The wireless communications system 200 may include a UE 215-*a* and a UE 215-*b*, which may be examples of a UE 215 as described herein. The wireless communications system 200 may also include a base station 205-*a* and a base station 205-*b* which may be examples of a base station 205 as described herein. The base stations 205 may each be associated with a cell which provides wireless communications with the base station 205 within a respective coverage area 210.

The wireless communications system 200 may employ TDD communications where a wireless communications channel is used for both uplink transmissions and downlink transmissions. Each cell may configure a TDD configuration 220 for the cell. For example, the first cell of base station 205-*a* may use a first TDD configuration 220-*a*, and the second cell of base station 205-*b* may use a second TDD configuration 220-*b*. UEs 215 in these cells may communicate with the base stations based on the corresponding TDD configuration 220. For example, a slot of a TDD configuration 220 may include symbol periods for downlink symbols 225, flexible symbols 230, uplink symbols 235, or any combination thereof. The base station 205 may transmit downlink signals in a downlink symbol 225, and the UE 215 may transmit uplink signals in an uplink symbol 235. Flexible symbols 230 may, in some cases, be used as guard periods between the uplink transmissions and downlink transmissions. A guard period may prevent inter-symbol interference or may provide time for a UE 215 to adjust radio frequency hardware, reconfigure antennas, or the like. In some cases, a flexible symbol 230 may be dynamically reconfigured to either a downlink symbol 225 or an uplink symbol 235.

A base station 205 may dynamically change the TDD configurations 220. In an example, the traffic in the first cell may shift toward being more uplink-heavy so the first TDD configuration 220-*a* of the first cell may change to using a slot configuration which has more uplink symbol periods. In some cases, a TDD configuration 220 may be dynamically indicated to UEs in the cell by a slot format indicator (SFI) in a downlink control information (DCI) transmission. The DCI transmission conveying the SFI may be transmitted in one of the first few downlink symbols 225 of the slot. Additionally, or alternatively, the TDD configuration 220 may be semi-statically configured (e.g., included in a radio resource control configuration) by higher layer signaling.

In some cases, different TDD configurations 220 used by neighboring cells may lead to conflicting transmission directions for some symbol periods of a slot. For example, the 9th and 10th symbol periods of the slot shown may have conflicting directions for the first TDD configuration 220-*a* and the second TDD configuration 220-*b*. The TDD configuration 220-*a* may have uplink symbols 235 configured when the TDD configuration 220-*b* has downlink symbols 225 configured. Therefore, UE 215-*a* in the first cell may be configured to transmit an uplink transmission while UE 215-*b* in the second cell is configured to receive a downlink transmission. The first cell and the second cell may be neighboring cells, and UE 215-*b* and UE 215-*a* may be near each other at the edge of their respective cell. In some cases, the uplink transmission of UE 215-*a* may cause CLI 240 to reception of the downlink transmission at UE 215-*b* at the conflicting symbol periods. Generally, differing TDD configurations 220 may result in CLI 240 when an uplink symbol of one cell collides with a downlink symbol of another nearby cell. CLI 240 may occur near or between cell edge UEs of nearby cells. CLI may also occur if different UEs are configured with different TDD configurations for a same cell. The UE 215 transmitting the uplink signal (e.g., UE 215-*a*) may be referred to as the aggressor UE 215, and the UE 215 which is receiving the affected downlink transmission (e.g., UE 215-*b*) may be referred to as the victim UE 215.

To manage CLI 240 in the wireless communications system, a victim UE 215 (e.g., UE 215-*b*) may perform a measurement process to determine one or more metrics of the CLI 240 to determine a strength of the CLI 240. In some such processes, the victim UE 215 may notify a serving base station 205 (e.g., 205-*b*) of potential interference. The serving base station 205 may then configure resources for measuring one or more metrics of the CLI 240 and transmit a message to the victim UE 215-*b* indicating the resources. The victim UE 215 may then perform a measurement of one or more metrics of the CLI 240. For example, the one or more metrics may include a reference signal receive power (RSRP), a received signal strength indicator (RSSI), a signal-to-interference-plus-noise (SINR), or similar power measurements in order to determine how much CLI 240 is affecting the victim UE 215. In some cases, the RSRP measurement may be performed on respective reference signals transmitted by the aggressor UE 215 (e.g., UE 215-*a*) for measuring CLI 240, while RSSI may measure all interference sources including the reference signals transmitted by the aggressor UE 215 and other noise. Such reference signals may include sounding reference signals (SRSs), demodulation reference signals (DMRSs) for PUCCH or PUSCH or the like. For example, the aggressor UE 215 may transmit a first set of sounding reference signals (SRSs) to enable a victim UE 215 to measure an RSRP on the SRSs for determining the strength of CLI 240, a second set of SRSs to enable the victim UE 215 to measure an RSSI on the SRSs (e.g., SRSs for RSSI) for determining the strength of CLI 240, or any combination thereof.

In some cases, the CLI measurement resource may be associated with existing reference signals that a victim UE 215 measures to determine different metrics about the CLI 240. For example, the CLI measurement resource may include SRSs, demodulation reference signals (DMRSs) for PUCCH or PUSCH, or similar uplink signals that an aggressor wireless device transmits during one or more corresponding downlink symbols at the victim UE 215. Accordingly, the victim UE 215 may measure a strength of the CLI 240 based on one or more CLI measurement resources received from the aggressor wireless device. After determining the strength of the CLI 240, the victim UE 215 may report the CLI measurement to the serving base station 205. The serving base station 205 may then initiate a CLI management procedure whereby the CLI 240 is eliminated or otherwise considered.

While it is shown in FIG. 2 that each UE 215-*a* and UE 215-*b* are connected to a first and second cell with corresponding base stations 205-*a* and 205-*b*, respectively, different scenarios may exist where uplink transmissions from UE 215-*a* may cause CLI on downlink transmissions received by UE 215-*b*. The various techniques described herein may also be applied for other UE to base station connection topologies. For example, the victim UE 215 may not know whether an aggressor UE 215 is in a same cell, a neighboring cell of a homogenous deployment, or in a different cell of an overlapping or heterogeneous deployment. If the aggressor UE 215 is in a different cell of a heterogeneous deployment, the base stations 205 associated with the cells may or may not be co-located. In some cases, the victim UE may not know the UE to base station connection topology (e.g., the relationship between a serving cell of the victim UE and a serving cell of an aggressor UE). In such cases, the victim UE may not know one or more timing parameters to use for measuring CLI 240. Such timing misalignment between serving cells may result in poor or failed CLI measurements, inefficient use of resources, and decreased system efficiency. Additionally, the victim UE 215 may not know which aggressor UEs 215 to prioritize when measuring CLI. Such instances may, in some cases, lead to an inefficient use of measurement resources, excessive power expenditures, or the like. Such alternative connection topologies and challenges introduced thereby are further described with reference to FIGS. 3A and 3B. To address such challenges, a base station 205 may provide information regarding the relationship between serving cells to a victim UE 215, as described in greater detail with reference to FIG. 5.

FIGS. 3A and 3B illustrate examples of wireless communications systems 300 and 301, which may be examples of a wireless communications systems 100 and 200, and may support cross link interference measurement configuration in accordance with aspects of the present disclosure. In some examples, wireless communications systems 300 and 301 may implement aspects of wireless communications systems 100 or 200. Wireless communications systems 300 and 301 may include UEs 315 which may be examples of UEs 115 and 215. Wireless communications systems 300 and 301 may also include one or more base stations 305 which may be examples of a base station 105 or 205. The one or more base stations 305 may each be associated with a cell which provides communications with the one or more base stations 305 with a respective coverage areas 310. In some examples, the wireless communications systems 300 and 301 may represent UE to base station connection topologies as described with reference to FIG. 2.

With reference to FIG. 3A, a UE 315-$a$ and a UE 315-$b$ may be operating within a same serving cell and may both be in communication with a base station 305-$a$. In such examples, if the UE 315-$a$ is transmitting uplink signals when the UE 315-$b$ is transmitting downlink signals, then the UE 315-$a$ may interfere with the UE 315-$b$, creating CLI. In these examples, the UE 315-$a$ may be referred to as an aggressor UE and the UE 315-$b$ may be referred to as a victim UE. In some cases, the victim UE 315-$b$ may perform a measurement of the CLI created by aggressor UE 315-$a$. Such a measurement may, in some cases, be referred to as an intra-cell CLI measurements. In some examples, one or more timing parameters associated with the CLI measurement may correspond with a timing of the victim UE 315-$b$.

With reference to FIG. 3B, a UE 315-$c$ and a UE 315-$d$ may be operating within different cells and in communication with a base station 305-$b$ and a base station 305-$c$, respectively. In some examples, the serving cell of UE 315-$c$ and the serving cell of UE 315-$d$ may be neighboring cells of a homogeneous deployment (e.g., a same type of cell). In such examples, if the UE 315-$c$ is transmitting uplink signals when the UE 315-$d$ is receiving downlink signals, then the UE 315-$c$ may interfere with the UE 315-$d$, creating CLI. In these examples, the UE 315-$c$ may be referred to as an aggressor UE and the UE 315-$d$ may be referred to as a victim UE. In some cases, the victim UE 315-$b$ may perform a measurement of CLI created by the aggressor UE 315-$c$. Such a measurement may, in some cases, be referred to as an inter-cell CLI measurement. In some examples, one or more timing parameters associated with the CLI measurement may be different from a timing of the victim UE 315-$d$.

A victim UE 315 may not have access to or know a TDD configuration, uplink or downlink TTI order, or SRS transmission configuration of an aggressor UE 315. A victim UE 315 may measure CLI based on a network CLI resource configuration. That is, a victim UE may not perform blind detection of a CLI and then perform CLI measurements before a base station 305 provides a CLI resource configuration. CLI may occur between UEs 315 within a same cell, as shown with reference to FIG. 3A, or across different cells, as shown with reference to FIG. 3B.

FIG. 4 illustrates an example of a wireless communications system 400 that supports cross-link interference measurement in multiple directions in accordance with aspects of the present disclosure. In some examples, wireless communications system 400 may implement aspects of wireless communication systems 100, 200, and 300.

In some examples, base station 405 may communicate with UE 415 using one or more beam pairs. For instance, base station 405 and UE 415 may communicate using a transmit beam 420 and a receive beam 425-$b$. However, UE 415 415 may be capable of selecting between multiple candidate transmit beams 420 or receive beams 425 for improved reception of downlink signaling in a serving cell. For instance, for each downlink beam 420, UE 415 may perform a beam sweeping procedure (e.g., may attempt to receive reference signals transmitted via transmit beam 420 using multiple receive beams 425) to find a preferred receive beam 425-$b$. The selected receive beam 425 and its corresponding transmit beam 420 may be referred to as a beam pair. UE 415 may monitor each candidate transmit beam 420 using each receive beam 425 over time. UE 415 may switch to a new receive beam 425 (e.g., may change a beam pair) when a target receive beam (e.g., receive beam 425-$c$) measures a reference signal from base station 405 over transmit beam 420 having a stronger signal strength than reference signals transmitted over transmit beam 420 and received via a current receive beam 425-$b$. In some examples, UE 415 may change its receive beam 425 if it measures a weak or weakening transmit receive point reference signal strength over receive beam 425.

In some wireless communications systems, UE 415 may measure and report CLI to base station 405 in the direction of only one receive beam 425 (e.g., in the direction of a current or active receive beam 425-$b$ used for receiving downlink data and signaling from a serving cell). In such examples, UE 415 and base station 405 may only know current interference levels (e.g., CLI on receive beam 425-$b$), but may not know whether or how much CLI is experienced on other receive beams 425 (e.g., receive beam 425-$a$ and receive beam 425-$c$). Thus, base station 405 may not have relevant or current information regarding whether a beam switch from receive beam 425-$b$ to receive beam 425-$c$ would result in improved communications with UE 415 or decreased signal quality. For instance, UE 415 may measure and report CLI on receive beam 425-$b$. To improve communications, base station 405 may initiate a beam pair change resulting in a receive beam change from receive beam 425-$b$ to receive beam 425-$c$. However, UE 115-$c$ may experience higher levels of CLI on receive beam 425-$c$ than on receive beam 425-$b$. Base station 405 may thus improve communications, more efficiently select beam pairs, update TDD configurations for victim UEs 415 or aggressor UEs 415, or a combination thereof, based on CLI information for multiple receive beams 425.

In some examples, as described herein, a UE 415 may experience CLI in multiple directions. In such examples, UE 415 may measure and report CLI across multiple receive beams 425. Base station 405 may use the reported CLI for multiple receive beams 425 to improve communication quality. For example, base station 405 may determine how CLI impacts potential downlink transmission over different transmit beams 420 or beam pairs, and may thus be able to select a preferred transmit beam 420, receive beam 425, beam pair, or the like, for communicating with UE 415. The selected or preferred beams or beam pairs may result in improved communication quality, decreased system latency, improved system reliability, and improved user experience. In some examples, base station 405 may be able to determine interference conditions for UE 415 (e.g., instead of identifying only interference from a particular direction), and base station 405 may adjust TDD configurations, adjust scheduling, update transmit power at UE 415, or the like, based on the determined interference conditions. Such scheduling and transmit power adjustments or updates may result in improved system efficiency, decreased interference, decreased system latency, and improved user experience. In some examples, UE 415 may be able to detect the presence of other UEs 415 based on measured CLI, which may improve sidelink applications. In some examples, UE 415 may perform positioning enhancement procedures by determining relative positions of other UEs 415 (e.g., based on angular information determined by measuring CLI in multiple directions).

A UE 415 may perform CLI measurements in multiple directions over CLI measurement resources configured by base station 405. In some examples, UE 415 may determine which receive beams 425 to use for measuring CLI implicitly (e.g., using receive beams used to receive other signals), or based on an explicit indication received from base station 405.

FIG. 5 illustrates an example of a wireless communications system 500 that supports cross-link interference measurement in multiple directions in accordance with aspects of the present disclosure. In some examples, wireless communications system 500 may implement aspects of wireless communication systems 100, 200, 300, and 400.

Base station 505 may communicate with UE 515 over one or more beam pairs. For example, base station 505 may be able to communicate with UE 515 via one or more transmit beams (e.g., transmit beam 520-a, transmit beam 520-b, transmit beam 520-c, etc.). UE 515 may be able to communicate with base station 505 via one or more receive beams 525 (e.g., receive beam 525-a, receive beam 525-b, receive beam 525-c, etc.). Base station 505 and UE 515 may communicate using an active beam pair (e.g., transmit beam 520-b and receive beam 525-b). In some examples, base station 505 may transmit channel state information reference signals (CSI-RSs) to UE 515 over multiple transmit beams 520, and UE 515 may perform CSI measurements on the CSI-RSs received over multiple receive beams 525. For instance, base station 505 may transmit a first CSI-RS over transmit beam 520-a, a second CSI-RS over transmit beam 520-b, and a third CSI-RS over transmit beam 520-c. UE 515 may receive and measure each reference signals using receive beam 525-a, receive beam 525-b, and receive beam 525-c. Similarly, UE 515 may receive synchronization signals (e.g., one or more SSBs) using one or more receive beams 525. In some examples, CSI-RS resources, SSBs, or other reference signal resources may be associated with receive beams 525, such that by identifying a particular resource UE 515 may identify a particular receive beam 525. The association may be based on measurement of the CSI-RS or SSB has a higher signal quality (e.g., RSRP or SINR) in the associated receive beam than measurements in the other receive beams.

In some examples, signals transmitted over one or more beam pairs may reflect off of an object 510. For instance, base station 505 may transmit a downlink signal (e.g., a reference signal) over transmit beam 520-a. the downlink signal may reflect off of object 510-a, and be received by UE 515 on one or more receive beams 520. In such examples, signal strength may vary across beam pairs. For instance, transmit beam 520-a and receive beam 525-a may be an active beam pair (e.g., may have higher signal quality than a more directionally aligned beam pair such as transmit beam 520-b and receive beam 525-b). Similarly, transmit beam 520-c and receive beam 525-c may be selected as an active beam pair with high signal quality resulting from a reflective object 510-b. Because variations in beam pairs may be beneficial for high signal quality and reliable communications, it may be beneficial for base station 505 to have access to information regarding CLI in multiple directions. For instance, UE 515 may experience CLI on receive beam 525-b. Base station 505 may thus determine to initiate a beam change procedure to communicate with UE 515 over transmit beam 520-a and receive beam 525-a. However, if UE 515 also experiences CLI on receive beam 525-a, such a beam pair change may result in degradation of communication quality, increased interference, increased system latency, reduced user experience, and the like. Base station 505 may improve communication reliability and system efficiency by adjusting TDD configurations, selecting beam pairs, and the like, based on complete CLI information for a UE 515 in multiple directions (e.g., instead of limited CLI information for a UE in a single direction).

To measure and report CLI in multiple directions, UE 515 may measure CLI using multiple receive beams 525. UE 515 may perform layer-3 CLI measurements on multiple receive beams 525, and may report on CLI measurement resources from the same aggressor UE in multiple beam directions. In some examples, UE 515 may determine which receive beams 525 to use for measuring CLI on CLI measurement resources implicitly. For instance, UE 515 may determine which receive beams 525 it uses to perform downlink receive beam sweeping (e.g., which receive beams 525 UE 515 uses for performing a beam sweeping operation when determining a preferred or current receive beam 525), and may use the same receive beams or the same beam sweeping pattern on the CLI measurement resources to perform multi-directional CLI measurements. UE 515 may determine which receive beams 525 it uses for monitoring PDSCH, PDCCH, failure detection reference signals, CSI-RSs, SSBs, or a combination thereof, and may select the same receive beams 525 for performing CLI measurements. In some examples, base station 505 may explicitly indicate, to UE 515, which receive beams UE 515 is to use for performing multi-directional CLI measurements. For instance, base station 505 may indicate (e.g., for each CLI measurement resource), beam directions in which the UE 515 monitors for RSs or SSBs, and UE 515 may use the same receive beam 525 uses or previously used for monitoring for RSs or SSBs. In some examples, the explicit indication may include an index of a RS resource or an SSB, and UE 515 may select a receive beam 525 used for monitoring the indicated RS resource or SSB for performing CLI measurements.

Performing CLI measurements may include measuring an SRS transmitted by an aggressor UE. For instance, UE 515 may measure RSRP from an aggressor UE during a configured CLI measurement resource. In some examples, performing measurements may include measuring a received signal strength from multiple aggressor UEs. For instance, UE 515 may measure RSSI for multiple aggressor UEs.

Having measured CLI in multiple directions, UE 515 may report multi-directional CLI information to base station 505. A CLI report may include measured CLI measurement values over all selected downlink receive beam 525 or a subset of selected downlink receive beams 525 (e.g., having highest CLI measurement values), an indicator for reference signals, SSBs, or the like, that are associated with the transmit beams 520 that are beam paired with receive beam 525 UE 515 used to measure CLI or a subset of the selected receive beams 525 UE 515 used to measure CLI (e.g., the reference signals or SSBs associated with the receive beams experiencing the highest CLI measurement values), or both.

Multi-directional CLI measurements may include various optional procedures. For instance, for a set of SSBs or CSI-RSs, UE 515 may pair up transmit beams 520 in which SSBs or CSI-RSs are transmitted with receive beams 525 based on receive beam sweeping. In such examples, a CLI report may indicate the paired transmit beams 520 associated with the receive beams 525 that experience CLI. In some examples, UE 515 may determine that it measures CLI on a particular CLI measurement resource using a receive beam 525 associated with a set of SSBs or CSI-RSs. UE 515 may, in such examples, include in a CLI report an indication of the associated SSBs or CSI-RSs. In some examples, UE 515 may simply measure CLI on each configured CLI measurement resource using receive beams 525 selected as described herein (e.g., implicitly selected or explicitly indicated by base station 505), and may report CLI measurement values for each configured CLI measurement resource (or for a subset of CLI measurement resources having highest CLI measurement values or satisfying a threshold CLI measurement value).

FIG. 6 illustrates an example of a process flow 600 that supports cross-link interference measurement in multiple directions in accordance with aspects of the present disclosure. In some examples, process flow 600 may implement aspects of wireless communication system 100. Process flow 600 may include a base station 605, a UE 615-*a* and a UE 615-*b*, which may be examples of corresponding devices as described with reference to wireless communications systems 100, 200, 300, 400, and 500.

At 620, base station 605-*a* may transmit, to UE 615-*a*, a configuration message. The configuration message may include an indication of one or more resources for receiving synchronization signals, CSI-RSs, or the like. Base station 605 may indicate a first set of resources (e.g., CLI measurement resources) for measuring CLI at 525. At 620, base station 605 may indicate a second set of resources, a set of receive beams for monitoring for the CSI-RSs or SSBs, or the like, or a combination thereof. The second set of resources may thus include CSI-RS resources, synchronization signal resources, SSBs, PBCH resources, failure detection reference signal resources, or any combination thereof.

At 625-*a* and 625-*b*, base station 605 may transmit a CLI configuration message. The CLI configuration message may indicate CLI measurement resources. For instance, at 625-*a*, base station 605 may transmit CLI configuration information to UE 615-*b*. The CLI configuration information may include an instruction to transmit reference signals (e.g., sounding reference signals) during indicated CLI measurement resources. At 625-*b*, base station 605 may transmit configuration information to UE 615-*a*. The CLI configuration information may include an instruction to perform one or more CLI measurements during the indicated CLI measurement resources. In some examples, the CLI configuration information at 625-*b* may further include an indication (e.g., an index) associated with one or more CSI-RSs or SSBs configured at 620 associated with a particular receive beam UE 615 is to use for performing CLI measurements on the indicated CLI measurement resources, as described herein at 635.

At 630, UE 615-*a* may identify the first set of resources for performing CLI measurements. That is, UE 615-*a* may identify the first set of CLI measurement resources indicated at 625-*b*. CLI measurements may be based on periodic resource configurations. CLI reporting, as described at 650 may be a layer-3 mechanism.

CLI measurements may, in some instance, be comparable to CSI-RS measurements for mobility. CSI-RS measurements or mobility may be based on CSI-RS-Resource-Mobility procedure, wherein an associated SSB is configured to a resource. In such cases, a UE may use a timing of an associated SSB to receive CSI-RS resources. If SSB and CSI-RS are quasi-co-located (e.g., if a Quasi-Colocated indicator is set to true), then CSI-RS and an associated SSB may be transmitted from a same base station 605, and UE 615 may receive them in the same direction. However, for a CLI measurement case, the SSB and CSI-RS may not be transmitted from the same device because CLI occurs due to transmissions by another UE (e.g., UE 615-*b*). Thus, a UE 615 may determine which receive beams to use for measuring CLI.

At 635, UE 615-*a* may identify a set of receive beams for performing the CLI measurements. UE 615-*a* may determine the set of receive beams implicitly. A downlink receive beam may be determined by reference to a quasi-co-located type-D source. Thus, by identifying a particular reference signal, UE 615-*a* may also identify a corresponding receive beam. For example, the set of receive beams for CLI measurements may be the same receive beams that UE 615 is configured to use (e.g., at 620) for receiving one or more types of downlink reference signals, subsets of reference signals, or combinations of different types of reference signals. Different resources may correspond to different transmit beams. Thus, UE 615-*a* may determine a set of receive beams for receiving a type of downlink signal (e.g., CSI-RSs, SSB, PBCH reference signals, failure detection reference signals, reference signals associated with activated TCI states or sets of TCI states, reference signals associated with active control resource sets (CORESETs), reference signals associated with configured CORESETs, or the like), and may use the same set of receive beams for measuring CLI.

In some examples, UE 615-*a* may determine a set of signals (e.g., CSI-RSs or SSBs) on which UE 615-*a* performs measurements for different downlink transmit beams to support beam selection (e.g., beam pair procedures, transmit beam selection, downlink receive beam selection, or the like). In such examples, UE 615-*a* may use receive beams associated with the set of signals for CLI measurements.

In some examples, UE 615-*a* may determine reference signals associated with CSI-RSs, SS/PBCH block resources, or both, that are configured by base station 605 (e.g., at 620) for other layer-1 measurements (e.g., L1-RSRP reporting, L1-SINR reporting). RSRP and SINR reporting may include determining an average power and signal to noise ratio of resource ports (e.g., time-frequency resources used for the CLI measurement) for a same resource. In such examples, UE 615-*a* may use the receive beams associated with the set of reference signals for performing CLI measurements.

In some examples, UE 615-*a* may determine one or more reference signals associated with a set of activated TCI states for a PDSCH. For instance, base station 605 may configure multiple TCI sets to UE 615-*a*. Each TCI set may include up to eight TCI states. Base station 605 may activate one of the TCI sets via a control message (e.g., via a media access control element (MAC-CE)). The network may use the activated TCI states for downlink data transmissions. Base station 605 may further indicate a specific TCI state for PDSCH via a downlink control information (DCI) message. UE 615-*a* may identify reference signals associated with the active TCI state, or the active TCI set, or a combination thereof, and may use receive beams associated with the identified reference signals for CLI measurements.

In some examples, UE 615-*a* may identify reference signals associated with an activated TCI state for active CORESETs configured to UE 615-*a* (e.g., at 620). TCI states for active CORESETs maybe used for PDCCH monitoring in each CORESET. In such examples, UE 615-*a* may use the set of receive beams for PDCCH monitoring in each CORESET, or for monitoring reference signals associated with the activated TCI state for the active CORESET, or a combination thereof, and may perform CLI measurements using the selected set of receive beams.

In some examples, UE 615-*a* may identify reference signals included in the TCI states (e.g., indicated in a configuration message) in each configured CORESET. These TCI states may include a subset of TCI states configured to a PDSCH. UE 615-*a* may use the receive beams associated with the identified reference signals for performing CLI measurements.

In some examples, UE 615-*a* may identify failure detection reference signals. Failure detection reference signals may be indicated by a configuration message. UE 615-*a* may determine a set of receive beams used for receiving failure detection reference signals, and may perform CLI measurements using the receive beams.

UE 615-*a* may determine any of the above reference signals, or any combination thereof, to identify the set of receive beams on which to perform CLI measurements. In some examples, UE 615-*a* may also utilize a beam sweeping pattern associated with the reference signals, or an order of receive beams associated with the identified reference signals, and may perform CLI using the identified pattern or order. The beam sweeping pattern may be configured by base station 605.

In some examples, base station 605 may explicitly indicate which receive beams UE 615-*a* is to use for performing CLI measurements. For example, base station 605 may indicate a list of reference signals indicating the downlink receive beams over which CLI measurement resources are to be measured. In some examples, base station 605 may configure each CLI measurement resource (e.g., at 625-*b*), with a different index of an associated CSI-RS or SSB, indicating the downlink receive beam on which UE 615-*a* is to measure CLI.

For example, in some examples, base station 605 may provide a list of reference signals, indicating associated receive beams over which UE 615-*a* is to measure CLI. The reference signals may be SSBs or CSI-RSs. Base station 605 may include corresponding indices of SSBs or CSI-RSs in the configuration of the CLI measurement resources (e.g., at 625-*b*). In some examples, base station 605 may transmit the CLI configuration information, including the CSI-RS or SSB indices, in an RRC measurement object of layer-3 CLI measurement and reporting. Additionally, or alternatively, base station 605 may configure (e.g., at 625-*b* in a same CLI configuration message, or a separate configuration message), a time domain pattern for UE 615-*a* to sweep the indicated downlink receive beams in time over which the UE to measure the CLI measurement resources. In some examples, the beam sweeping pattern may be implemented autonomously by UE 615-*a*, determined based on previously configured beam-sweeping patterns (e.g., for beam refining or beam selecting procedures), or may be preconfigured. For instance, UE 615-*a* may determine to sweep through a first receive beam associated with a first CSI-RS, a second receive beam associated with a second CSI-RS, a third receive beam associated with a third CSI-RS, etc. Thus, UE 615-*a* may apply a time-domain beam sweeping pattern to the set of receive beams associated with the indicated list of CSI-RSs or SSBs, and may perform CLI measurements on at least a portion of the configured CLI measurement resources on the set of receive beams in the order and timing of the time-domain beam sweeping pattern.

In some examples, base station 605 may configure multiple CLI measurement resources (e.g., at 625-*b*), and may configure each CLI measurement resource with a different index of an associated CSI-RS or SSB. The indices may indicate, to UE 615-*a*, the receive beams associated with the indexed CSI-RSs or SSBs. Thus, if a first CLI measurement resources is configured with an index to a first CSI-RS associated with a first receive beam, and a second CLI measurement resource is configured with an index to a second CSI-RS associated with a second receive beam, then UE 615-*a* may use the first receive beam for CLI measurement during the first CLI measurement resource and the second receive beam for CLI measurement during the second CLI measurement resource. In some examples, multiple CLI measurement resources may correspond to CLI generated by the same aggressor UE 615-*b*. This may allow UE 615-*a* to measure CLI on multiple receive beams across multiple CLI measurement resources (e.g., one receive beam per CLI measurement resource for each aggressor UE 615-*b*). In some examples, each CLI measurement resource may be configured in a different transmission time interval (TTI) (e.g., a different OFDM symbol), which may allow UE 615-*a* to only measure in one downlink receive beam direction at a time. In some examples, an RRC signaling information element (IE) may indicate a CLI measurement resource set. The CLI measurement resource set may be defined to include a configuration of the set of multiple resources, indices for CSI-RSs, SSBs, or both. In some examples, to indicate CLI measurement resources or indexed reference signals or both, base station 605 may indicate a periodicity, may assume a same periodicity as another type of signal (e.g., CSI-RSs, SSBs, or the like), may indicate an offset from other scheduled signals, may indicate a same or different sequence, frequency, bandwidth, or the like. Such an indication (e.g., a periodicity, an offset, a bandwidth, etc.) may decrease signaling overhead, packet size, or the like, resulting in increased throughput and system efficiency.

At 640, UE 615-*b* may transmit one or more reference signals (e.g., SRSs), as instructed by base station 605 at 625-*a*.

At 645, UE 615-*a* may perform CLI measurements during at least a portion of the first set of resources using the set of receive beams identified at 635.

At 650, UE 615-*a* may transmit a CLI report to UE 605. The measurement report may include CLI measurement values, indications of receive beams over which CLI is measured, indications of reference signals associated with receive beams, or any combination thereof.

In some examples, the CLI report may include an indication of CLI measurements for all receive beams. In some examples, the CLI report may include a subset of CLI measurement values. For instance, UE 615-*a* may select a subset of highest CLI measurement values up to a fixed or maximum number of CLI measurement values and may include the subset of CLI measurement values. In some examples, UE 615-*a* may select a subset of highest CLI measurement values that satisfy a threshold or minimum CLI measurement value, and may include the select subset of CLI measurement values in the CLI report (e.g., regardless of how many CLI measurement values satisfy the threshold CLI measurement value).

In some examples, the CLI report may include a set of indices for CSI-RSs or SSBs or both, associated with receive beams that experience a highest level of CLI. For example, CLI measurement values for CLI on a subset of receive beams may satisfy a threshold CLI measurement value. Or, the CLI report may include a fixed number of receive beams that experience higher CLI measurement values than a remainder of measured receive beams. In either case, UE 615-*a* may include indices for CSI-RSs or SSBs associated with the identified receive beams that experience higher CLI. Reporting reference signal indices (e.g., instead of actual CLI measurement values) may allow UE 615-*a* to conserve power and computational resources because UE 615-*a* may refrain from storing measured CLI measurement values. Instead, UE 615-*a* may perform the CLI measurement, identify reference signals associated with receive beams that experienced higher CLI measurement values, and then drop the CLI measurement values (e.g., instead of storing or reporting the CLI measurement values).

In some examples, the CLI report may include both a number of strongest CLI measurement values and corresponding indices of CSI-RSs and SSBs associated with the receive beams on which the strongest CLI measurement values were taken.

CLI reports may include only a single CLI measurement value, or a single index of a CSI-RS or SSB, or a single index and CLI measurement value that is higher than any of the other CLI measurement values. In some examples, UE 615-*a* may include only CLI measurement values that satisfy a threshold. That is, if a CLI measurement value satisfies a threshold then the CLI measurement value, the index for the associated CSI-RS or SSB, or both, are included in the CLI report.

In some examples, UE 615-*a* may perform a filtering procedure. In such examples, UE 615-*a* may filter instantaneous CLI measurements prior to transmitting the CLI report at 650. Thus, UE 615-*a* may filter (e.g., windowing filter, finite impulse response (FIR) filter, infinite impulse response (IIR) filter) instantaneous CLI measurements, and then transmit filtered CLI measurements to base station 605.

FIG. 7 shows a block diagram 700 of a device 705 that supports cross-link interference measurement in multiple directions in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to cross-link interference measurement in multiple directions, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify a first set of resources for performing cross-link interference measurements, identify a set of receive beams for performing the cross-link interference measurement over the identified first set of resources, perform cross-link interference measurements during at least a portion of the first set of resources using the set of receive beams, and transmit, to a base station, a cross-link interference report including an indication of the cross-link interference measurements for the set of receive beams. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 may be implemented as an integrated circuit or chipset for a mobile device modem, and the receiver 710 and transmitter 720 may be implemented as analog components (e.g., amplifiers, filters, antennas) coupled with the mobile device modem to enable wireless transmission and reception over one or more bands.

The communications manager 715 as described herein may be implemented to realize one or more potential advantages. One implementation may allow the device to effectively report CLI, resulting in improved configuration of TDD, reduced interference, improved adjustments in beam pairs, reduced system latency, and improved user experience.

Based on techniques for efficiently communicating maximum number of layers for a device as described herein, a processor of a UE 115 (e.g., controlling the receiver 710, the transmitter 720, or a transceiver 1020 as described with respect to FIG. 10) may increase system efficiency and decrease unnecessary processing at a device.

FIG. 8 shows a block diagram 800 of a device 805 that supports cross-link interference measurement in multiple directions in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to cross-link interference measurement in multiple directions, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a resources identification manager 820, a beam identification manager 825, a CLI measurement manager 830, and a CLI report manager 835. The communications manager 815 may be an example of aspects of the communications manager 1010 described herein.

The resources identification manager 820 may identify a first set of resources for performing cross-link interference measurements.

The beam identification manager 825 may identify a set of receive beams for performing the cross-link interference measurement over the identified first set of resources.

The CLI measurement manager 830 may perform cross-link interference measurements during at least a portion of the first set of resources using the set of receive beams.

The CLI report manager 835 may transmit, to a base station, a cross-link interference report including an indication of the cross-link interference measurements for the set of receive beams.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

FIG. 9 shows a block diagram 900 of a communications manager 905 that supports cross-link interference measurement in multiple directions in accordance with aspects of the present disclosure. The communications manager 905 may be an example of aspects of a communications manager 715, a communications manager 815, or a communications manager 1010 described herein. The communications manager 905 may include a resources identification manager 910, a beam identification manager 915, a CLI measurement manager 920, a CLI report manager 925, a resource configuration manager 930, a TCI state manager 940, and a filtering manager 945. Each of these modules may communicate, directly or indirectly, with one another (e.g., via one or more buses).

The resources identification manager 910 may identify a first set of resources for performing cross-link interference measurements.

The beam identification manager 915 may identify a set of receive beams for performing the cross-link interference measurement over the identified first set of resources. In some examples, the beam identification manager 915 may determine an association between the set of receive beams and one or more downlink signals, the one or more downlink signals associated with a second set of resources.

The CLI measurement manager 920 may perform cross-link interference measurements during at least a portion of the first set of resources using the set of receive beams. In some examples, the CLI measurement manager 920 may measure one or more reference signals transmitted by a second UE. In some examples, the CLI measurement manager 920 may measure a received power on the first set of resources.

The CLI report manager 925 may transmit, to a base station, a cross-link interference report including an indication of the cross-link interference measurements for the set of receive beams. In some cases, a first set of cross-link interference measurement values associated with a first subset of the set of receive beams, where the first set of cross-link interfere measurement values are higher than a second set of cross-link interference measurement values associated with a second subset of the set of receive beams. In some cases, one or more indices of synchronization signal blocks or channel state information reference signals associated with the set of receive beams. In some cases, one or more indices of synchronization signal blocks or channel state information reference signals associated with a first subset of the set of receive beams, where cross-link interfere measurement values for the first subset of the set of receive beams are higher than cross-link interference measurements for a second subset of the set of receive beams.

The resource configuration manager 930 may receive, from the base station, a configuration message indicating the second set of resources, the set of receive beams, or both. In some examples, the resource configuration manager 930 may receive, from the base station, a radio resource control message configuring the first set of resources, the radio resource control message including an indication of the one or more downlink signals associated with the set of receive beams, where identifying the set of receive beams for performing the cross-link interference measurement is based on receiving the radio resource control message. In some examples, the resource configuration manager 930 may identify a beam sweeping pattern for the set of receive beams associated with the one or more downlink signals, where performing cross-link interference measurements during at least the portion of the first set of resources using the set of receive beams is based on the beam sweeping pattern for the set of receive beams.

In some examples, the resource configuration manager 930 may receive a control message configuring the first set of resources from the base station, the control message including an index associated with a synchronization signal block or a channel state information reference signal for determining at least one receive beam of the set of receive beams for each respective resource of the first set of resources. In some cases, the one or more downlink signals include synchronization signal block reference signals, channel state information reference signals, or a combination thereof. In some cases, each of the first set of resources are located in a different transmission time interval. In some cases, the control message includes an information element of a radio resource control message. In some cases, the second set of resources include channel state information reference signal resources, synchronization signal resources, physical broadcast channel resources, failure detection reference signal resources, or a combination thereof.

The TCI state manager 940 may receive, from the base station, a configuration message indicating a set of transmission configuration indicator (TCI) states associated with a physical downlink shared channel. In some examples, the TCI state manager 940 may receive, from the base station, a control message including an instruction to activate a subset of the set of TCI states for communications over the physical downlink shared channel. In some examples, the TCI state manager 940 may identify the first set of resources is based on a reference signal configured for the subset of the set of TCI states. In some examples, the TCI state manager 940 may identify the first set of resources is based on one or more reference signals associated with the set of TCI states of control resource sets.

The Filtering manager 945 may perform a filtering procedure for a set of cross-link interference measurements, where transmitting the cross-link interference report is based on performing the filtering procedure.

FIG. 10 shows a diagram of a system 1000 including a device 1005 that supports cross-link interference measurement in multiple directions in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify a first set of resources for performing cross-link interference measurements, identify a set of receive beams for performing the cross-link interference measurement over the identified first set of resources, perform cross-link interference measurements during at least a portion of the first set of resources using the set of receive beams, and transmit, to a base station, a cross-link interference report including an indication of the cross-link interference measurements for the set of receive beams.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting cross-link interference measurement in multiple directions).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

FIG. 11 shows a block diagram 1100 of a device 1105 that supports cross-link interference measurement in multiple directions in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to cross-link interference measurement in multiple directions, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may configure, for a first UE, a first set of resources for performing cross-link interference measurements, identify a set of downlink signals associated with a set of receive beams to be used by the first UE for performing the cross-link interference measurement over the identified first set of resources, and receive, from the first UE, a cross-link interference report including an indication of the cross-link interference measurements for at least a subset of the set of receive beams. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

FIG. 12 shows a block diagram 1200 of a device 1205 that supports cross-link interference measurement in multiple directions in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to cross-link interference measurement in multiple directions, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a resource configuration manager 1220, a beam identification manager 1225, and a CLI report manager 1230. The communications manager 1215 may be an example of aspects of the communications manager 1410 described herein.

The resource configuration manager 1220 may configure, for a first UE, a first set of resources for performing cross-link interference measurements.

The beam identification manager 1225 may identify a set of downlink signals associated with a set of receive beams to be used by the first UE for performing the cross-link interference measurement over the identified first set of resources.

The CLI report manager 1230 may receive, from the first UE, a cross-link interference report including an indication of the cross-link interference measurements for at least a subset of the set of receive beams.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

FIG. 13 shows a block diagram 1300 of a communications manager 1305 that supports cross-link interference measurement in multiple directions in accordance with aspects of the present disclosure. The communications manager 1305 may be an example of aspects of a communications manager 1115, a communications manager 1215, or a communications manager 1410 described herein. The communications manager 1305 may include a resource configuration manager 1310, a beam identification manager 1315, a CLI report manager 1320, and a TCI state manager 1325. Each of these modules may communicate, directly or indirectly, with one another (e.g., via one or more buses).

The resource configuration manager 1310 may configure, for a first UE, a first set of resources for performing cross-link interference measurements. In some examples, the resource configuration manager 1310 may transmit, to the first UE, a configuration message indicating the second set of resources, the set of receive beams, or both. In some examples, the resource configuration manager 1310 may transmit, to the first UE, a radio resource control message configuring the first set of resources, the radio resource control message including an indication of the set of downlink signals associated with the set of receive beams, where identifying the set of downlink signals associated with the set of receive beams to be used by the first UE for performing the cross-link interference measurement is based on transmitting the radio resource control message. In some examples, the resource configuration manager 1310 may transmit, to the first UE, an indication of a beam sweeping pattern for the set of receive beams associated with the set of downlink signals, where identifying the set of downlink signals associated with the set of receive beams is based on the beam sweeping pattern for the set of receive beams.

In some examples, the resource configuration manager 1310 may transmit, to the first UE, a control message configuring the first set of resources, the control message including an index associated with a synchronization signal block or a channel state information reference signal for determining at least one receive beam of the set of receive beams for each respective resource of the first set of resources. In some cases, the downlink signals include channel state information reference signals, synchronization signals, physical broadcast channels, failure detection reference signals, or a combination thereof. In some cases, the downlink signals include synchronization signals, channel state information reference signals, or a combination thereof. In some cases, each of the first set of resources are located in a different transmission time interval. In some cases, the control message includes an information element of a radio resource control message.

The beam identification manager 1315 may identify a set of downlink signals associated with a set of receive beams to be used by the first UE for performing the cross-link interference measurement over the identified first set of resources.

The CLI report manager 1320 may receive, from the first UE, a cross-link interference report including an indication of the cross-link interference measurements for at least a subset of the set of receive beams. In some cases, a first set of cross-link interference measurement values associated with a first subset of the set of receive beams, where the first set of cross-link interfere measurement values are higher than a second set of cross-link interference measurement values associated with a second subset of the set of receive beams. In some cases, one or more indices of synchronization signal blocks or channel state information reference signals associated with the set of receive beams. In some cases, one or more indices of synchronization signal blocks or channel state information reference signals associated with a first subset of the first set of resources associated with a first subset of the set of receive beams, where cross-link interfere measurement values for the first subset of the set of receive beams are higher than cross-link interference measurements for a second subset of the set of receive.

The TCI state manager 1325 may transmit, to the first UE, a configuration message indicating a set of transmission configuration indicator (TCI) states associated with a physical downlink shared channel. In some examples, the TCI state manager 1325 may transmit, to the first UE, a control message including an instruction to activate a subset of the set of TCI states for communications over the physical downlink shared channel. In some examples, the TCI state manager 1325 may identify the set of downlink signals is based on a reference signal configured for the subset of the set of TCI states. In some examples, the TCI state manager 1325 may identify the set of downlink signals is based on one or more reference signals associated with the set of TCI states of control resource sets.

FIG. 14 shows a diagram of a system 1400 including a device 1405 that supports cross-link interference measurement in multiple directions in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may configure, for a first UE, a first set of resources for performing cross-link interference measurements, identify a set of downlink signals associated with a set of receive beams to be used by the first UE for performing the cross-link interference measurement over the identified first set of resources, and receive, from the first UE, a cross-link interference report including an indication of the cross-link interference measurements for at least a subset of the set of receive beams.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting cross-link interference measurement in multiple directions).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

FIG. 15 shows a flowchart illustrating a method 1500 that supports cross-link interference measurement in multiple directions in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may identify a first set of resources for performing cross-link interference measurements. For example, the base station may transmit, to the UE, an RRC message configuring the first set of resources. The operations of 1505 may be performed according to the methods described herein. In some examples, aspects of the operations of 1505 may be performed by a resources identification manager as described with reference to FIGS. 7 through 10.

At 1510, the UE may identify a set of receive beams for performing the cross-link interference measurement over the identified first set of resources. For example, the UE may identify a set of downlink signals associated with a set of receive beams used. In some examples, the base station may transmit an RRC message which may include an indication of one or more downlink signals associated with the set of receive beams. The operations of 1510 may be performed according to the methods described herein. In some examples, aspects of the operations of 1510 may be performed by a beam identification manager as described with reference to FIGS. 7 through 10.

At 1515, the UE may perform cross-link interference measurements during at least a portion of the first set of resources using the set of receive beams. For instance, the UE may measure SRSs transmitted from one or more other UEs on some or all of the first set of resources. In some examples, the UE may measure RSSI (e.g., for all devices transmitting on the first set of resources). In some examples, the UE may measure RSRP (e.g., for a single UE transmitting on the resources). The operations of 1515 may be performed according to the methods described herein. In some examples, aspects of the operations of 1515 may be performed by a CLI measurement manager as described with reference to FIGS. 7 through 10.

At 1520, the UE may transmit, to a base station, a cross-link interference report including an indication of the cross-link interference measurements for the set of receive beams. For example, the base station may receive a CLI report that includes CLI measurements, or indices of one or more resources associated with CLI measurements, or a combination thereof. The operations of 1520 may be performed according to the methods described herein. In some examples, aspects of the operations of 1520 may be performed by a CLI report manager as described with reference to FIGS. 7 through 10.

FIG. 16 shows a flowchart illustrating a method 1600 that supports cross-link interference measurement in multiple directions in accordance with aspects of the present disclosure. The operations of method 1600 may be implemented by a base station 105 or its components as described herein. For example, the operations of method 1600 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1605, the base station may configure, for a first UE, a first set of resources for performing cross-link interference measurements. For example, the base station may transmit an RRC message configuring the first set of resources. The operations of 1605 may be performed according to the methods described herein. In some examples, aspects of the operations of 1605 may be performed by a resource configuration manager as described with reference to FIGS. 11 through 14.

At 1610, the base station may identify a set of downlink signals associated with a set of receive beams to be used by the first UE for performing the cross-link interference measurement over the identified first set of resources. For example, the base station may configure the downlink signals (e.g., reference signals) to be associated with the set of receive beams (e.g., for beam selection procedures, CSI reporting, or the like). In some examples, the base station may transmit an RRC message which may include an indication of one or more downlink signals associated with the set of receive beams. The operations of 1610 may be performed according to the methods described herein. In some examples, aspects of the operations of 1610 may be performed by a beam identification manager as described with reference to FIGS. 11 through 14.

At 1615, the base station may receive, from the first UE, a cross-link interference report including an indication of the cross-link interference measurements for at least a subset of the set of receive beams. For example, the base station may receive a CLI report that includes CLI measurements, or indices of one or more resources associated with CLI measurements, or a combination thereof. The operations of 1615 may be performed according to the methods described herein. In some examples, aspects of the operations of 1615 may be performed by a CLI report manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
    one or more processors;
    one or more memories coupled with the one or more processors; and
    instructions stored in the one or more memories and executable by the one or more processors to cause the apparatus to:
        receive, from a network device, a control message configuring a first set of resources for performing cross-link interference measurements, the control message indicating a plurality of indexes, each index of the plurality of indexes corresponding to a downlink signal of a set of downlink signals, wherein each downlink signal of the set of downlink signals indicated by the plurality of indexes corresponds to a receive beam of a set of receive beams;
        identify the set of receive beams for performing the cross-link interference measurements over the first set of resources in accordance with the set of downlink signals;
        perform the cross-link interference measurements during at least a portion of the first set of resources using the set of receive beams; and
        transmit, to the network device, a cross-link interference report comprising an indication of a respective cross-link interference measurement for each receive beam of at least a first subset of the set of receive beams.

2. The apparatus of claim 1, wherein the instructions are further executable by the one or more processors to cause the apparatus to:
    determine an association between the set of receive beams and one or more downlink signals, wherein the set of receive beams are identified based at least in part on the set of receive beams being used to receive the one or more downlink signals via a second set of resources different from the first set of resources.

3. The apparatus of claim 2, wherein the instructions are further executable by the one or more processors to cause the apparatus to:
    receive, from the network device, a configuration message indicating the second set of resources, the set of receive beams, or both.

4. The apparatus of claim 2, wherein the second set of resources comprise channel state information reference signal resources, synchronization signal resources, physical broadcast channel resources, failure detection reference signal resources, or a combination thereof.

5. The apparatus of claim 2, wherein the instructions are further executable by the one or more processors to cause the apparatus to:

receive, from the network device, a configuration message indicating a set of transmission configuration indicator (TCI) states associated with a physical downlink shared channel; and receive, from the network device, a second control message comprising an instruction to activate a subset of the set of TCI states for communications over the physical downlink shared channel, wherein the first set of resources is identified based at least in part on a reference signal configured for the subset of the set of TCI states and one or more reference signals associated with the set of TCI states of control resource sets.

6. The apparatus of claim 2, wherein the instructions are further executable by the one or more processors to cause the apparatus to:
receive, from the network device, a radio resource control message configuring the first set of resources, the radio resource control message comprising an indication of the one or more downlink signals associated with the set of receive beams, wherein identifying the set of receive beams for performing the cross-link interference measurements is based at least in part on receiving the radio resource control message, and wherein the one or more downlink signals comprise synchronization signal block reference signals, channel state information reference signals, or a combination thereof.

7. The apparatus of claim 6, wherein the instructions are further executable by the one or more processors to cause the apparatus to:
identify a beam sweeping pattern for the set of receive beams associated with the one or more downlink signals, wherein performing cross-link interference measurements during at least the portion of the first set of resources using the set of receive beams is based at least in part on the beam sweeping pattern for the set of receive beams.

8. The apparatus of claim 1, wherein each of the first set of resources are located in a different transmission time interval.

9. The apparatus of claim 1, wherein the control message comprises an information element of a radio resource control message.

10. The apparatus of claim 1, wherein the cross-link interference report comprises a first set of cross-link interference measurement values associated with the first subset of the set of receive beams in accordance with each cross-link interference measurement value of the first set of cross-link interference measurement values exceeding a threshold.

11. The apparatus of claim 1, wherein, to perform the cross-link interference measurements, the instructions are executable by the one or more processors to cause the apparatus to:
measure one or more reference signals transmitted by a second UE.

12. The apparatus of claim 1, wherein, to perform the cross-link interference measurements, the instructions are executable by the one or more processors to cause the apparatus to:
measure a received power on the first set of resources.

13. An apparatus for wireless communications at a network device, comprising:
one or more processors;
one or more memories coupled with the one or more processors; and
instructions stored in the one or more memories and executable by the one or more processors to cause the apparatus to:
transmit a control message that configures, for a first user equipment (UE), a first set of resources for performing cross-link interference measurements, the control message indicating a plurality of indexes, each index of the plurality of indexes corresponding to a downlink signal of a set of downlink signals, each downlink signal of the set of downlink signals indicated by the plurality of indexes corresponding to a receive beam of
a set of receive beams to be used by the first UE for performing the cross-link interference measurements over the first set of resources; and
receive, from the first UE, a cross-link interference report comprising an indication of a respective cross-link interference measurement for each receive beam of at least a subset of the set of receive beams.

14. The apparatus of claim 13, wherein the instructions are further executable by the one or more processors to cause the apparatus to:
transmit, to the first UE, a configuration message indicating a second set of resources, the set of receive beams, or both, wherein the set of receive beams are used to transmit the set of downlink signals via the second set of resources different from the first set of resources.

15. The apparatus of claim 13, wherein the set of downlink signals comprise channel state information reference signals, synchronization signals, physical broadcast channels, failure detection reference signals, or a combination thereof.

16. The apparatus of claim 13, wherein the instructions are further executable by the one or more processors to cause the apparatus to:
transmit, to the first UE, a configuration message indicating a set of transmission configuration indicator (TCI) states associated with a physical downlink shared channel; and
transmit, to the first UE, a control message comprising an instruction to activate a subset of the set of TCI states for communications over the physical downlink shared channel, wherein the set of downlink signals is identified based at least in part on a reference signal configured for the subset of the set of TCI states.

17. The apparatus of claim 13, wherein the control message is a radio resource control message.

18. A method for wireless communications at a user equipment (UE), comprising:
receiving, from a network device, a control message configuring a first set of resources for performing cross-link interference measurements, the control message indicating a plurality of indexes, each index of the plurality of indexes corresponding to a downlink signal of a set of downlink signals, wherein each downlink signal of the set of downlink signals indicated by the plurality of indexes corresponds to a receive beam of a set of receive beams;
identifying the set of receive beams for performing the cross-link interference measurements over the first set of resources in accordance with the set of downlink signals;
performing the cross-link interference measurements during at least a portion of the first set of resources using the set of receive beams; and
transmitting, to the network device, a cross-link interference report comprising an indication of a respective cross-link interference measurement for each receive beam of at least a first subset of the set of receive beams.

* * * * *